United States Patent
Share et al.

(10) Patent No.: US 11,254,837 B2
(45) Date of Patent: Feb. 22, 2022

(54) COATING COMPOSITIONS HAVING COVALENTLY BOUND ULTRAVIOLET ABSORBERS

(71) Applicant: BASF SE, Ludwigshafen (DE)

(72) Inventors: Paul Share, Ann Arbor, MI (US); Mervin G. Wood, Riverview, MI (US)

(73) Assignee: BASF SE

( * ) Notice: Subject to any disclaimer, the term of this patent is extended or adjusted under 35 U.S.C. 154(b) by 798 days.

(21) Appl. No.: 16/073,526

(22) PCT Filed: Apr. 25, 2017

(86) PCT No.: PCT/US2017/029365
§ 371 (c)(1),
(2) Date: Jul. 27, 2018

(87) PCT Pub. No.: WO2018/199927
PCT Pub. Date: Nov. 1, 2018

(65) Prior Publication Data
US 2021/0206996 A1    Jul. 8, 2021

(51) Int. Cl.
C09D 175/06 (2006.01)
C09D 7/63 (2018.01)
C08K 5/00 (2006.01)
C08K 5/3435 (2006.01)
C08K 5/3492 (2006.01)

(52) U.S. Cl.
CPC ............ *C09D 175/06* (2013.01); *C09D 7/63* (2018.01); *C08K 5/005* (2013.01); *C08K 5/3435* (2013.01); *C08K 5/3492* (2013.01)

(58) Field of Classification Search
None
See application file for complete search history.

(56) References Cited

U.S. PATENT DOCUMENTS

| | | |
|---|---|---|
| 4,078,015 A | 3/1978 | Leitheiser et al. |
| 4,179,548 A | 12/1979 | Schroeter et al. |
| 4,210,612 A | 7/1980 | Karrer |
| 4,223,147 A | 9/1980 | Oertel et al. |
| 4,230,857 A | 10/1980 | Drake et al. |
| 4,276,401 A | 6/1981 | Karrer |
| 4,292,237 A | 9/1981 | Layer et al. |
| 4,369,274 A | 1/1983 | Thomas |
| 4,504,628 A | 3/1985 | Johnson |
| 5,004,770 A | 4/1991 | Cortolano et al. |
| 5,047,489 A | 9/1991 | Ravichandran et al. |
| 5,106,891 A | 4/1992 | Valet |
| 5,459,222 A | 10/1995 | Rodgers et al. |
| 5,541,274 A | 7/1996 | Steinmann |
| 5,605,965 A | 2/1997 | Rehfuss et al. |
| 6,013,704 A | 1/2000 | Hayoz et al. |
| 6,037,441 A | 3/2000 | Ohrbom et al. |
| 6,060,543 A | 5/2000 | Bolle et al. |
| 6,147,163 A | 11/2000 | Boisseau et al. |
| 6,166,148 A | 12/2000 | Ohrbom et al. |
| 2006/0052491 A1 | 3/2006 | Braig et al. |
| 2012/0177929 A1 | 7/2012 | Meyer Zu Berstenhorst et al. |
| 2012/0243115 A1 | 9/2012 | Takamiya et al. |
| 2016/0017169 A1 | 1/2016 | Kostromine et al. |

FOREIGN PATENT DOCUMENTS

| | | |
|---|---|---|
| EP | 0 787 159 A1 | 8/1997 |
| WO | WO-2014/026925 A1 | 2/2014 |

OTHER PUBLICATIONS

International Search Report and Written Opinion in International Application No. PCT/US2017/029365, dated Jan. 25, 2018 (19 pages).
European Search Report for EP Patent Application No. 17907727.6, dated Nov. 16, 2020, 3 pages.

*Primary Examiner* — Robert T Butcher
(74) *Attorney, Agent, or Firm* — Faegre Drinker Biddle & Reath LLP

(57) ABSTRACT

A coating composition includes a coating resin, a triazine ultraviolet light absorber of Formula (I), and a hindered light amine stabilizer, where Formula (I) has the structure:

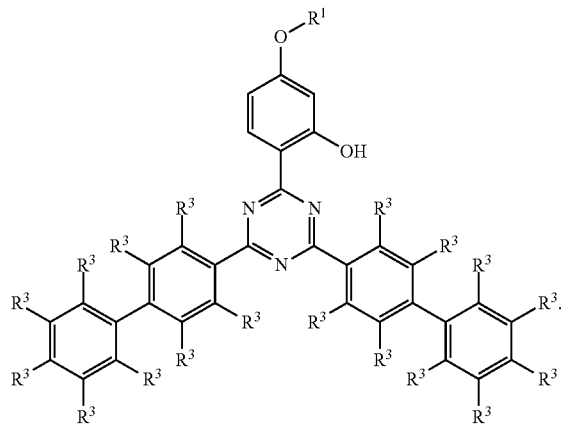

21 Claims, No Drawings

COATING COMPOSITIONS HAVING COVALENTLY BOUND ULTRAVIOLET ABSORBERS

CROSS-REFERENCE TO RELATED APPLICATIONS

This application is a U.S. National Phase Application under 35 U.S.C. § 371 of International Application No. PCT/US2017/029365, filed on Apr. 25, 2017, the contents of which are incorporated herein by reference in their entirety.

FIELD

The present technology relates to stabilized coating compositions having select ultraviolet absorbers covalently attached thereto. The instant coating compositions contain a select triazine ultraviolet light absorber (UVA) covalently attached thereto.

BACKGROUND

Multicoat paint systems used in the automotive OEM finishing sector nowadays consist in general of an electrophoretically applied primer, which protects against corrosion and stone chipping, and a subsequent surfacer coat, which protects against stone chipping and smoothens the surface. The surfacer coat is usually applied to the already-baked primer, and cured. An alternative possibility is to cure primer and surfacer coat jointly. Applied subsequently to the cured surfacer coat is a single-coat finish or a decorative two-coat finish composed of a color and/or effect basecoat, which is applied in one or more spray passes as a function of the respective shade, and a protective clearcoat, which is applied wet-on-wet to the basecoat. Subsequently, the single-coat finish or the basecoat(s) and the clearcoat is or are jointly cured.

Increasingly, however, automakers are concerned to reduce the coat thicknesses of the paint system and also the number of operations and also, where appropriate, the number of coats, without any attendant deterioration in the performance profile of the multicoat paint systems, particularly any deterioration in UV stability.

SUMMARY

In one aspect, a coating composition is provided. The coating composition includes a coating resin; a triazine ultraviolet light absorber of Formula (I); and a hindered amine light stabilizer, wherein Formula (I) has the structure:

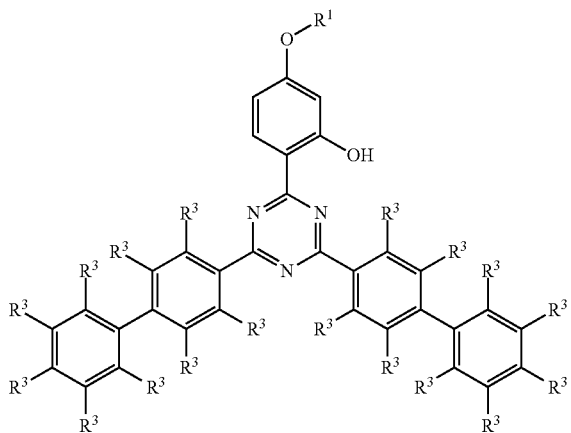

wherein
$R^1$ is $C_1$-$C_{18}$ straight chain alkyl, $C_3$-$C_{18}$ branched chain alkyl or a 5-12 membered cycloalkyl, wherein each of the $C_1$-$C_{18}$ straight chain alkyl, $C_3$-$C_{18}$ branched chain alkyl and the 5-12 membered cycloalkyl is substituted with one or more of —$OR^5$, —$NR^5R^5$, —$C(O)N(R^5)_2$, —$C(O)$, —$C(O)O$, —$C(O)R^5$, —$C(O)OR^5$, —$OC(O)$, —$NCO$—, or —$OC(O)R^5$; or said alkyl or said cycloalkyl interrupted by one to four epoxy, —O—, —NR—, —$CONR^5$—, —COO—, —OCO—, —CO—, —$C(R^5)$=$C(R^5)COO$—, —$OCOC(R^5)$=C($R^5$)—, —$C(R^5)$=$C(R^5)$—, phenylene or phenylene-G-phenylene in which G is —O—, —S—, —$SO_2$—, —$CH_2$— or —$C(CH_3)_2$— or combinations thereof, or said alkyl or said cycloalkyl both substituted and interrupted by combinations of the groups mentioned above;
each $R^5$ is independently H, $C_1$-$C_{24}$ straight or branched chain alkyl, $C_2$-$C_{24}$ alkenyl, $C_6$-$C_{10}$ aryl, or a 5-12 membered cycloalkyl;
each $R^3$ is independently H, cyano, halo, a $C_1$-$C_{10}$ alkyl, a $C_1$-$C_{10}$ alkoxy, a 5-12 membered cycloalkyl, —C(O)$R^5$, —C(O)(O)$R^{15}$, or —C(O)$NR^{15}R^{15}$;
each $R^{15}$ is independently H or $C_1$-$C_8$ alkyl; and
wherein
the triazine ultraviolet light absorber of Formula (I) is covalently linked to the coating resin through $R^1$, wherein the covalent link is between the coating resin and the one or more —$OR^5$, —$NR^5R^5$, —$C(O)N(R^5)_2$, —$C(O)$, —$C(O)O$, —$C(O)R^5$, —$C(O)OR^5$, —$OC(O)$, or —$OC(O)R^5$ of $R^1$.

In another aspect, a method of stabilizing a coating composition on a substrate toward ultraviolet radiation is provided. The method includes applying the coating composition provided herein to the substrate.

In another aspect, a durability enhancing agent is provided. The durability enhancing agent includes a reaction product between a) ultraviolet light absorbers (UVA) and mixtures thereof having a reactive functionality thereon; and b) a non-acrylic monomeric, oligomeric or polymeric component, having a reactive functionality thereon to react with the reactive functionality of a), wherein either a) or b) includes more than one carbamate functional group, a group convertible to a carbamate group, or a group that crosslinks with a carbamate functional group, and the reaction product is a polymer-covalently bound UVA that includes more than one carbamate functional group, group convertible to a carbamate group, or a group that crosslinks with a carbamate functional group. The UVA may be a triazine UV absorber of Formula (I) as defined above.

In another aspect, a curable coating composition is provided. The curable coating composition includes the durability enhancing agent provided herein, a second oligomeric or polymeric resin that includes crosslinkable functional groups, and a crosslinking agent with a functionality that is reactive with the crosslinkable functional groups on the durability enhancing agent and the second oligomeric or polymeric resin. The second oligomeric or polymeric resin includes tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, lysine diisocyanate, tetramethylxylylene diisocyanate, trimethylhexane diisocyanate, tetramethylhexane diisocyanate, 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4- or 2,6-diisocyanato-1-methylcyclohexane, tolylene 2,4- or 2,6-diisocyanate, m- or p-xylylene diisocyanate, 2,4'- or 4,4'-diisocyanato-diphenylmethane, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate, 1,4-diisocyanatobutane, 1,5-diisocyanatopentane, hexamethylene diisocyanate (HDI), 1,11-diisocyanatoundecane, 1,12-diisocyanatododecane, 2,2,4- and 2,4,4-trimethyl-1,6-diisocyanatohexane, 1-isocyanato-3,3,5-trimethyl-5-isocyanatomethyl cyclohexane (IPDI, isophorone diisocyanate), 1,3-diisocyanatocyclobutane, 1,3- and 1,4-diisocyanatocyclohexane, 4,4'-bis-(isocyanatocyclohexyl)-methane (HMDI), 1,2-bis-(isocyanatomethyl)-cyclobutane, 1,3- and 1,4-bis-(isocyanatomethyl)-cyclohexane, hexahydro-2,4- and/or -2,6-diisocyanatotoluene, bis-isocyanatomethyl norbornane (isomer mixture), 2,5- and 2,6-bis-(isocyanatomethyl)-bicyclo[2.2.1]heptane, 1-isocyanato-4(3)-isocyanatomethyl-1-methyl cyclohexane, p-xylylene diisocyanate, 2,3-bis-(8-isocyanatooctyl)-4-octyl-5-hexyl cyclohexane and mixtures thereof.

In another aspect, provided herein is a curable coating composition, wherein the composition includes an oligomeric or polymeric resin that includes crosslinkable functional groups and a crosslinking agent that includes a reaction product of the durability enhancing agent provided herein and a crosslinking compound. The durability enhancing magnet includes at least one primary carbamate reactive functionality that can react with the crosslinking compound. The crosslinking compound may include blocked and unblocked polyisocyanates, isocyanurate trimers of the polyisocyanates, urea resins, alkoxy ureas, polyanhydrides, polyepoxies and polysiloxanes.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In general, "substituted" refers to an alkyl, alkenyl, alkynyl, aryl, or ether group, as defined below (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

As used herein, "alkyl" groups include straight chain and branched alkyl groups having from 1 to about 20 carbon atoms, and typically from 1 to 12 carbons or, in some embodiments, from 1 to 8 carbon atoms. As employed herein, "alkyl groups" include cycloalkyl groups as defined below. Alkyl groups may be substituted or unsubstituted. Examples of straight chain alkyl groups include methyl, ethyl, n-propyl, n-butyl, n-pentyl, n-hexyl, n-heptyl, and n-octyl groups. Examples of branched alkyl groups include, but are not limited to, isopropyl, sec-butyl, t-butyl, neopentyl, and isopentyl groups. Representative substituted alkyl groups may be substituted one or more times with, for example, amino, thio, hydroxy, cyano, alkoxy, and/or halo groups such as F, Cl, Br, and I groups. As used herein the term haloalkyl is an alkyl group having one or more halo groups. In some embodiments, haloalkyl refers to a per-haloalkyl group.

As used herein, "alkylene" refers to a straight chain divalent alkyl group having from 2 to about 20 carbon atoms, and typically from 2 to 12 carbons or, in some embodiments, from 2 to 8 carbon atoms. Alkylene groups may be substituted or unsubstituted. Examples of straight chain alkylene groups include methylene, ethylene, n-propylene, n-butylene, n-pentylene, n-hexylene, n-heptylene, and n-octylene groups. Representative substituted alkyl groups may be substituted one or more times with, for example, amino, thio, hydroxy, cyano, alkoxy, and/or halo groups such as F, Cl, Br, and I.

As used herein, "alkenylene" refers to a straight chain divalent alkyl group having from 2 to about 20 carbon atoms, and typically from 2 to 12 carbons or, in some embodiments, from 2 to 8 carbon atoms, and further including at least one double bond. Alkylene groups may be substituted or unsubstituted. Representative substituents include, for example, amino, thio, hydroxy, cyano, alkoxy, and/or halo groups such as F, Cl, Br, and I.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 6, or 7. Cycloalkyl groups may be substituted or unsubstituted. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined above. Representative substituted cycloalkyl groups may be mono-substituted or substituted more than once, such as, but not limited to: 2,2-; 2,3-; 2,4-; 2,5-; or 2,6-disubstituted cyclohexyl groups or mono-, di-, or tri-substituted norbornyl or cycloheptyl groups, which may be substituted with, for example, alkyl, alkoxy, amino, thio, hydroxy, cyano, and/or halo groups.

Alkenyl groups are straight chain, branched or cyclic alkyl groups having 2 to about 20 carbon atoms, and further including at least one double bond. In some embodiments alkenyl groups have from 1 to 12 carbons, or, typically, from 1 to 8 carbon atoms. Alkenyl groups may be substituted or unsubstituted. Alkenyl groups include, for instance, vinyl, propenyl, 2-butenyl, 3-butenyl, isobutenyl, cyclohexenyl, cyclopentenyl, cyclohexadienyl, butadienyl, pentadienyl, and hexadienyl groups among others. Alkenyl groups may be substituted similarly to alkyl groups. Divalent alkenyl groups, i.e., alkenyl groups with two points of attachment, include, but are not limited to, CH—CH=CH$_2$, C=CH$_2$, or C=CHCH$_3$.

As used herein, "aryl", or "aromatic," groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6 to 10 carbon atoms in the ring portions of the groups. The phrase "aryl groups" includes groups containing fused rings, such as fused aromatic-aliphatic ring systems (e.g., indanyl, tetrahydronaphthyl, and the like). Aryl groups may be substituted or unsubstituted.

As used herein, "polyurethane" refers to a polymer composed of a chain of organic units joined by carbamate (urethane) links. Polyurethanes are formed by reacting a monomer having two or more isocyanate (—N=C=O) groups with a monomer having two or more hydroxyl (—OH) groups.

As used herein, "isocyanate" refers to a compound having an —N=C=O group, while "diisocyanate" refers to a compound having two or more such groups. Exemplary diisocyanates for use in the methods and foam described herein include methylene diphenyl diisocyanate (MDI), hexamethylene diisocyanate (HDI), toluene diisocyanate (TDI), isophorone diisocyanate (IPDI), methylene bis-cyclohexyl-diisocyanate (HMDI), and naphthalene diisocyanate (NDI). One or more isocyanates or diisocyanates (e.g., aromatic, aliphatic, cycloalkyl) can be used in differing amounts. Isocyanates and diisocyanates may be used in polyurethane foams. Isocyanates may be used as end caps on a polyurethane, while diisocyanates may be used as propagating repeat units of the polyurethane.

Provided herein are coating compositions that can be used in multicoat paint systems. In some aspects, the coating compositions can be used for vehicles, including but not limited to automobiles. Surprisingly, it has been found that certain select triazine UV absorbers are especially effective towards stabilizing coating compositions from the detrimental effect of UV light wherein said select triazine UV absorbers are covalently attached to a coating resin contained in the coating composition.

In one aspect, provided herein is a coating composition that includes a coating resin; a triazine ultraviolet light absorber of Formula (I); and a hindered amine light stabilizer. In the composition the light absorber of Formula (I) has the structure:

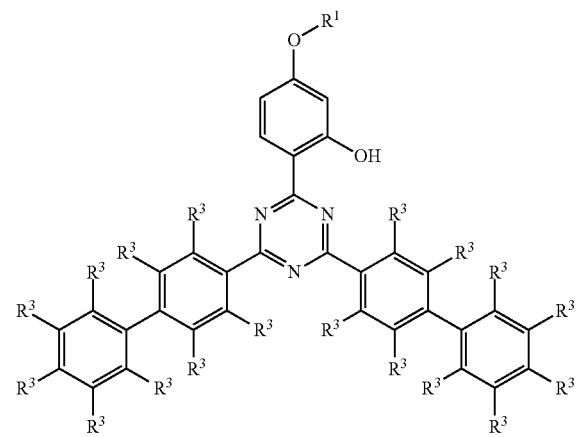

wherein
R$^1$ is C$_1$-C$_{18}$ straight chain alkyl, C$_3$-C$_{18}$ branched chain alkyl or a 5-12 membered cycloalkyl, wherein each of the C$_1$-C$_{18}$ straight chain alkyl, C$_3$-C$_{18}$ branched chain alkyl and the 5-12 membered cycloalkyl is substituted with one or more of —OR$^5$, —NR$^5$R$^5$, —C(O)N(R$^5$)$_2$, —C(O), —C(O)O, —C(O)R$^5$, —C(O)OR$^5$, —OC(O), —NCO—, or —OC(O)R$^5$; or said alkyl or said cycloalkyl interrupted by one to four epoxy, —O—, —NR—, —CONR$^5$—, —COO—, —OCO—, —CO—, —C(R$^5$)=C(R$^5$)COO—, —OCOC(R$^5$)=C(R$^5$)—, —C(R$^5$)=C(R$^5$)—, phenylene or phenylene-G-phenylene in which G is —O—, —S—, —SO$_2$—, —CH$_2$— or —C(CH$_3$)$_2$— or combinations thereof, or said alkyl or said cycloalkyl both substituted and interrupted by combinations of the groups mentioned above;

each R$^5$ is independently H, C$_1$-C$_{24}$ straight or branched chain alkyl, C$_2$-C$_{24}$ alkenyl, C$_6$-C$_{10}$ aryl, or a 5-12 membered cycloalkyl;

each R$^3$ is independently H, cyano, halo, a C$_1$-C$_{10}$ alkyl, a C$_1$-C$_{10}$ alkoxy, a 5-12 membered cycloalkyl, —C(O)R$^5$, —C(O)(O)R$^5$, or —C(O)NR$^5$R$^5$;

each R$^{15}$ is independently H or C$_1$-C$_8$ alkyl; and wherein
the triazine ultraviolet light absorber of Formula (I) is covalently linked to the coating resin through R$^1$, wherein the covalent link is between the coating resin and the one or more —OR$^5$, —NR$^5$R$^5$, —C(O)N(R$^5$)$_2$, —C(O), —C(O)O, —C(O)R$^5$, —C(O)OR$^5$, —OC(O), or —OC(O)R$^5$ of R$^1$.

In some embodiments, R$^1$ is further optionally substituted. In some embodiments, R$^1$ is a further optionally substituted C$_1$-C$_{18}$ alkyl or C$_3$-C$_{18}$ branched chain alkyl. In some embodiments, R$^1$ is a further optionally substituted C$_1$-C$_5$ alkyl. In some embodiments, R$^1$ is substituted with one or more of —OH, —NR$^5$R$^5$, or —OC(O)R$^5$.

In some embodiments, R$^5$ is a C$_9$ branched chain alkyl.
In some embodiments, R$^3$ is H.

In some embodiments, the coating resin is covalently linked to the $R^1$ wherein the covalent linkage is —OC(O)NH—, —OC(O)—, —NHC(O)NH—, —NHC(O)—, —OC(O)NR$^5$—, —NR$^5$C(O)NH—, —NR$^5$C(O)—, or —NR$^5$CONR$^5$—.

In some embodiments, the coating resin includes but is not limited to a thermoset acrylic melamine resin, an acrylic urethane resin, an epoxy carboxy resin, a silane modified acrylic melamine, an acrylic resin with carbamate pendant groups crosslinked with melamine, or an acrylic polyol resin crosslinked with melamine containing carbamate groups.

Suitable coating resins include but are not limited to polyurethane resins, acrylate resins, and polyester resins which are customarily employed in basecoat and/or clear coat materials in the field of the automotive industry. In some embodiments, the coating resin is a polyurethane resin, in combination where appropriate with one or more polyacrylate resins and/or with one or more polyester resins.

Polyurethane resins can be prepared by reacting at least one polyol selected from the group consisting of polyesterpolyols and polyetherpolyols. The polyol may have a number-average molecular weight of 400 to 5000, and at least one polyisocyanate and also if desired, at least one compound containing at least one isocyanate-reactive functional group and at least one (potentially) anionic group in the molecule, if desired, at least one further compound containing at least one isocyanate-reactive functional group, and if desired, at least one compound with a number-average molecular weight of 60 to 600 daltons, containing hydroxyl and/or amino groups in the molecule, and, in the case of polyurethane resins used for aqueous coating materials, neutralizing the resultant reaction product. Polyurethane resins of this kind are described for example in EP-B-228 003 and EP-B-574 417.

In some embodiments, polyurethane resins of this kind can be obtained, for example, by using as the isocyanate component isocyanates that are commonly used in the field of the paint industry. Some illustrative examples of the isocyanate include, but is not limited to, hexamethylene diisocyanate, octamethylene diisocyanate, decamethylene diisocyanate, dodecamethylene diisocyanate, tetradecamethylene diisocyanate trimethylhexane diisocyanate, tetramethylhexane diisocyanate, isophorone diisocyanate, 2-isocyanatopropylcyclohexyl isocyanate, dicyclohexylmethane 2,4'-diisocyanate, dicyclohexylmethane 4,4'-diisocyanate, 1,4- or 1,3-bis(isocyanatomethyl)cyclohexane, 1,4- or 1,3- or 1,2-diisocyanatocyclohexane, 2,4- or 2,6-diisocyanato-1-methylcyclo-hexane, diisocyanates derived from dimer fatty acids, as sold under the trade designation DDI 1410 by Henkel, 1,8-diisocyanato-4-isocyanato-methyloctane, 1,7-diisocyanato-4-isocyanatomethylheptane or 1-isocyanato-2-(3-isocyanatopropyl)cyclohexane, tetramethylxylylene diisocyanates (TMXDI), or mixtures of these polyisocyanates. In some embodiments, the isocyanate is tetramethylxylylene diisocyanates (TMXDI) and/or isophorone diisocyanate. In some embodiments, the isocyanate is isophorone diisocyanate.

Suitable coating resins in base coat (pigmented) or clear coat coating materials, together with or instead of the polyurethane resins, also include acrylated polyurethane resins. Acrylated polyurethane resins can be prepared by polymerizing ethylenically unsaturated monomers in the presence of a polyurethane resin. In this context it is possible to use polyurethane resins without double bonds and/or polyurethane resins with double bonds.

In some embodiments, the acrylated polyurethane resin has pendant and/or terminal double bonds. In some embodiments, the acrylated polyurethane resin has pendant and/or terminal ethenylarylene groups.

Acrylated polyurethane resins with pendant and/or terminal double bonds can be prepared by reacting a polyurethane prepolymer containing at least one free isocyanate group with a compound which contains at least one ethylenically unsaturated double bond and one group that is reactive toward NCO groups, in particular a hydroxyl group or an amino group.

Acrylated polyurethane resins with pendant and/or terminal double bonds can also be obtained by reacting a polyurethane prepolymer containing at least one group that is reactive toward NCO groups, in particular at least one hydroxyl group or one amino group, with a compound which contains at least one ethylenically unsaturated double bond and one free isocyanate group.

In some embodiments, the coating resin is a graft copolymer which can be prepared by polymerizing olefinically unsaturated monomers in the presence of the acrylated polyurethane resins having pendant and/or terminal double bonds. In some embodiments, the graft copolymer has a hydrophobic core which includes at least one copolymerized olefinically unsaturated monomer and a hydrophilic shell which includes at least one hydrophilic acrylated polyurethane. In other embodiments, the graft copolymer contains a hydrophobic core which includes at least one hydrophobic acrylated polyurethane and a hydrophilic shell which includes at least one copolymerized olefinically unsaturated monomer.

Non-limiting examples of acrylated polyurethane resins and graft copolymers prepared therefrom them are described WO 01/25307 and in EP-B-787 159.

In some embodiments, the polyurethane resin described herein can be used where appropriate in combination with one or more polyacrylate resins and/or with one or more polyester resins. Non-limiting examples of polyester resins include saturated or unsaturated polyester resins. In some embodiments, the polyester resin is saturated. In some embodiments, the polyester resin has a number-average molecular weight of 400 to 5000. Some non-limiting examples of polyester resins are described for example in EP-B-787 159.

In some embodiments, the amount of coating resin in the coating composition provided herein is generally 10% to 99% by weight based on the solids content of the coating resin. In some embodiments, the amount of coating resin present in the coating composition is 30% to 90% by weight based on the solids content of the coating resin.

In some embodiments, the coating resin contains a crosslinking agent. In some embodiments, the amount of crosslinking agent in the coating resin is 0 to 55% by weight based on the solids content of the coating resin. In some embodiments, the amount of crosslinking agent present in the coating resin is 5% to 40% by weight based on the solids content of the coating resin.

In some embodiments, the crosslinking agents are free isocyanates or blocked isocyanates and/or amino resins. Non-limiting suitable isocyanates include the isocyanates utilized to prepare polyurethane resins as described above and isocyanates that are commonly used in the paints industry. In some embodiments, the isocyanate is TACT, dimethylpyrazole-blocked trimeric hexamethylene diisocyanate, and/or trimeric hexamethylene diisocyanate.

Non-limiting examples of blocking agents include all commonly employed blocking agents, such as the corresponding alcohols, amines, ketones, pyrazoles, etc. In some embodiments, the blocking agent has a deblocking temperature less than 130° C.

Non-limiting examples of amino resins include amino resins that are commonly used in the paints industry, the properties of the pigmented coating materials being controllable via the reactivity of the amino resins. In some embodiments, the amino resin is a butanol-etherified amino resin. In some embodiments, the amino resin is Cymel® 203.

In some embodiments, the coating composition provided herein contains one or more triazine ultralight absorbers of Formula (I). In some embodiments, one to eight triazine ultraviolet light absorbers are present in the instant coating composition. This is understood to be one, two, three, four, five, six, seven, or eight triazine ultraviolet light absorbers are present in the instant coating composition. In some embodiments, one to four triazine ultraviolet light absorbers are present in the instant coating composition. In some embodiments, one or two triazine ultraviolet light absorbers are present in the instant coating composition.

The amount of the triazine ultraviolet light absorber present in the coating compositions provided herein is from about 0.1% to about 25% by weight based on the weight of the coating resin solids. In some embodiments, the amount of triazine ultraviolet light absorber present is from about 0.1% to about 15% by weight. In some embodiments, the amount of triazine ultraviolet light absorber present is from about 0.25% to about 10% by weight based on the weight of the coating resin solids. In some embodiments, the amount of triazine ultraviolet light absorber present is from about 0.5% to about 5% by weight based on the weight of the coating resin solids.

In yet other embodiments, the triazine ultraviolet light absorber is present at very low levels, from about 0.05% to about 3% by weight based on the weight of the coating resin solids. In some embodiments, the amount of triazine ultraviolet light absorber present is from about 0.05% to about 0.5% by weight based on the weight of the coating resin solids. In some embodiments, the amount of triazine ultraviolet light absorber present is from about 0.05% to about 0.3% by weight based on the weight of the coating resin solids.

In some embodiments, curing can take place thermally or air dried via solvent evaporation.

In some embodiments, a coating layer may be applied in one coat to achieve a coating thickness of from about 0.5 mil to about 10 mil, wherein one mil is equal to 25.4 microns. In some embodiments, the coating layer can be applied to achieve a coating thickness of from about 0.5 mil to about 5 mil. In other embodiments, the coating layer can be applied to achieve a coating thickness of from about 0.5 mil to about 3 mil.

One advantage of the triazine UV absorbers of Formula (I) provided herein is that they are more soluble in solvents and coating formulations when compared to those of the prior art.

In some embodiments, the triazine ultraviolet light absorber is:

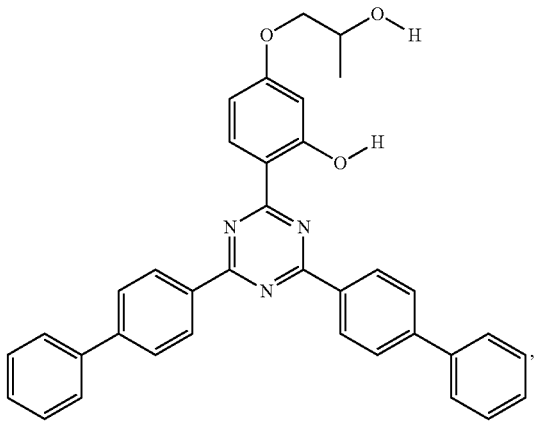

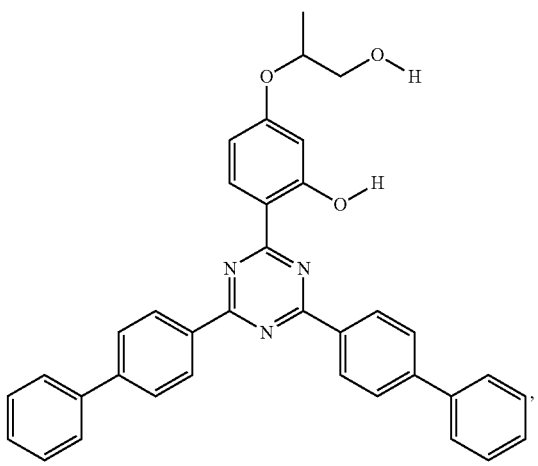

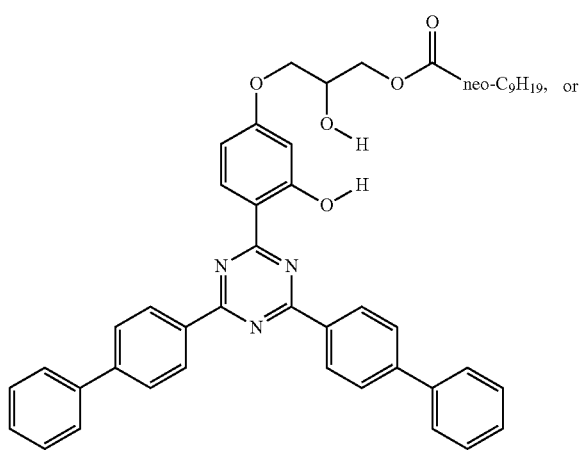

-continued

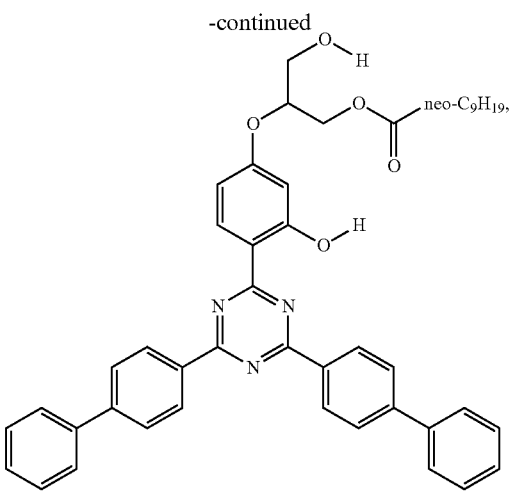

wherein neoC$_9$H$_{19}$ is a C$_9$ branched chain alkyl.

In some embodiments, the hindered amine light stabilizers are sterically hindered. In some embodiments, the sterically hindered amine light stabilizers (HALS) contain at least one moiety of Formula (II):

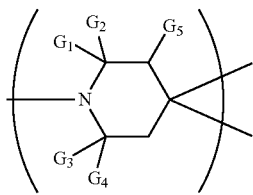

where G$_1$, G$_2$, G$_3$, G$_4$ and G$_5$ are each independently C$_1$-C$_8$ alkyl or G$_1$ and G$_2$ or G$_3$ and G$_4$ together are pentamethylene.

Non-limiting examples of the hindered amine light stabilizer are described in U.S. Pat. Nos. 5,004,770, 5,204,473, 5,096,950, 5,300,544, 5,112,890, 5,124,378, 5,145,893, 5,216,156, 5,844,026, 5,980,783, 6,046,304, 6,117,995, 6,271,377, 6,297,299, 6,392,041, 6,376,584 and 6,472,456.

In some embodiments, the hindered amine light stabilizers are hydroxyalkoxyamine stabilizers. Suitable examples of hydroxyalkoxyamine stabilizers are described in U.S. Pat. Nos. 6,271,377, 6,392,041 and 6,376,584.

In some embodiments, the hindered amine light stabilizer includes but is not limited to:
1-cyclohexyloxy-2,2,6,6-tetramethyl-4-octadecylaminopiperidine;
bis(2,2,6,6-tetramethylpiperidin-4-yl) sebacate;
bis(1-acetoxy-2,2,6,6-tetramethylpiperidin-4-yl) sebacate;
bis(1,2,2,6,6-pentamethyl-4-yl) sebacate;
bis(1-cyclohexyloxy-2,2,6,6-tetramethylpiperidin-4-yl) sebacate;
bis(1-octyloxy-2,2,6,6-tetramethylpiperidin-4-yl) sebacate;
bis(1-acyl-2,2,6,6-tetramethylpiperidin-4-yl) sebacate;
bis(1,2,2,6,6-pentamethyl-4-piperidyl) n-butyl-3,5-di-tert-butyl-4-hydroxybenzylmalonate;
2,4-bis[(1-cyclohexyloxy-2,2,6,6-tetramethylpiperidin-4-yl) butylamino]-6-(2-hydroxyethylamino-s-triazine;
bis(1-cyclohexyloxy-2,2,6,6-tetramethylpiperidin-4-yl) adipate;
2,4-bis[(1-cyclohexyloxy-2,2,6,6-piperidin-4-yl)butylamino]-6-chloro-s-triazine;
1-(2-hydroxy-2-methylpropoxy)-4-hydroxy-2,2,6,6-tetramethylpiperidine;
1-(2-hydroxy-2-methylpropoxy)-4-oxo-2,2,6,6-tetramethylpiperidine;
1-(2-hydroxy-2-methylpropoxy)-4-octadecanoyloxy-2,2,6,6-tetramethyl-piperidine;
bis(1-(2-hydroxy-2-methylpropoxy)-2,2,6,6-tetramethylpiperidin-4-yl) sebacate;
bis(1-(2-hydroxy-2-methylpropoxy)-2,2,6,6-tetramethylpiperidin-4-yl) adipate;
2,4-bis{N-[1-(2-hydroxy-2-methylpropoxy)-2,2,6,6-tetramethylpiperidin-4-yl]-N-butylamino}-6-(2-hydroxyethylamino)-s-triazine;
4-benzoyl-2,2,6,6-tetramethylpiperidine;
di-(1,2,2,6,6-pentamethylpiperidin-4-yl) p-methoxybenzylidenemalonate;
4-stearyloxy-2,2,6,6-tetramethylpiperidine;
bis(1-octyloxy-2,2,6,6-tetramethylpiperidyl) succinate;
1,2,2,6,6-pentamethyl-4-aminopiperidine;
2-undecyl-7,7,9,9-tetramethyl-1-oxa-3,8-diaza-4-oxo-spiro[4,5]decane;
tris(2,2,6,6-tetramethyl-4-piperidyl) nitrilotriacetate;
tris(2-hydroxy-3-(amino-(2,2,6,6-tetramethylpiperidin-4-yl) propyl) nitrilotriacetate;
tetrakis(2,2,6,6-tetramethyl-4-piperidyl)-1,2,3,4-butane-tetracarboxylate;
tetrakis(1,2,2,6,6-pentamethyl-4-piperidyl)-1,2,3,4-butane-tetracarboxylate;
1,1'-(1,2-ethanediyl)-bis(3,3,5,5-tetramethylpiperazinone);
3-n-octyl-7,7,9,9-tetramethyl-1,3,8-triazaspiro[4.5]decan-2,4-dione;
8-acetyl-3-dodecyl-7,7,9,9-tetramethyl-1,3,8-triazaspiro[4.5]decane-2,4-dione;
3-dodecyl-1-(2,2,6,6-tetramethyl-4-piperidyl)pyrrolidin-2,5-dione;
3-dodecyl-1-(1,2,2,6,6-pentamethyl-4-piperidyl)pyrrolidine-2,5-dione;
N,N'-bis-formyl-N,N'-bis(2,2,6,6-tetramethyl-4-piperidyl) hexamethylenediamine;
the reaction product of 2,4-bis[(1-cyclohexyloxy-2,2,6,6-piperidin-4-yl)-butylamino]-6-chloro-s-triazine with N,N'-bis(3-aminopropyl)ethylenediamine), CAS number 191680-81-6;
the condensate of 1-(2-hydroxyethyl)-2,2,6,6-tetramethyl-4-hydroxypiperidine and succinic acid, CAS number 65447-77-0;
linear or cyclic condensates of N,N'-bis(2,2,6,6-tetramethyl-4-piperidyl)-hexamethylenediamine and 4-tert-octylamino-2,6-dichloro-1,3,5-triazine, CAS number 71878-19-8 and CAS number 70624-18-9;
linear or cyclic condensates of N,N'-bis(2,2,6,6-tetramethyl-4-piperidyl)-hexamethylenediamine and 4-cyclohexylamino-2,6-dichloro-1,3,5-triazine;
linear or cyclic condensates of N,N'-bis-(2,2,6,6-tetramethyl-4-piperidyl)-hexamethylenediamine and 4-morpholino-2,6-dichloro-1,3,5-triazine, CAS number 82451-48-7;
linear or cyclic condensates of N,N'-bis-(1,2,2,6,6-pentamethyl-4-piperidyl)-hexamethylenediamine and 4-morpholino-2,6-dichloro-1,3,5-triazine, CAS number 193098-40-7;
the condensate of 2-chloro-4,6-bis(4-n-butylamino-2,2,6,6-tetramethylpiperidyl)-1,3,5-triazine and 1,2-bis(3-aminopropylamino)ethane, CAS number 106990-43-6;
the condensate of 2-chloro-4,6-di-(4-n-butylamino-1,2,2,6,6-pentamethylpiperidyl)-1,3,5-triazine and 1,2-bis-(3-aminopropylamino)ethane;

a reaction product of 7,7,9,9-tetramethyl-2-cycloundecyl-1-oxa-3,8-diaza-4-oxospiro[4,5]decane and epichlorohydrin, CAS number 202483-55-4;

poly[methyl,(3-oxy-(2,2,6,6-tetramethylpiperidin-4-yl)propyl)] siloxane, CAS number 164648-93-5;

reaction product of maleic acid anhydride-$C_{18}$-$C_{22}$-alpha-olefin-copolymer with 2,2,6,6-tetramethyl-4-aminopiperidine, CAS number 152261-33-1;

the oligomeric compound which is the condensation product of 4,4'-hexa-methylene-bis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine;

the oligomeric compound which is the condensation product of 4,4'-hexa-methylenebis(amino-1,2,2,6,6-pentaamethylpiperidine) and 2,4-dichloro-6-[(1,2,2,6,6-pentaamethylpiperidin-4-yl)butylamino]-s-triazine end-capped with 2-chloro-4,6-bis(dibutylamino)-s-triazine, CAS number 192268-64-7;

the oligomeric compound which is the condensation product of 4,4'-hexa-methylenebis(amino-1-propoxy-2,2,6,6-tetramethylpiperidine) and 2,4-dichloro-6-[(1-propoxy-2,2,6,6-tetramethylpiperidin-4-yl)butyl-amino]-s-triazine end-capped with 2-chloro-4,6-bis(dibutylamino)-s-triazine;

the oligomeric compound which is the condensation product of 4,4'-hexa-methylene-bis(amino-1-acyloxy-2,2,6,6-tetramethylpiperidine) and 2,4-dichloro-6-[(1-acyloxy-2,2,6,6-tetramethylpiperidin-4-yl)butylamino]-s-triazine end-capped with 2-chloro-4,6-bis(dibutylamino)-s-triazine;

product obtained by reacting a product, obtained by reacting 1,2-bis(3-amino-propylamino)ethane with cyanuric chloride, with (2,2,6,6-tetramethyl-piperidin-4-yl)butylamine, CAS number 136504-96-6;

1,6-hexanediamine,N1,N6-bis(2,2,6,6-tetramethyl-4-piperidinyl)-, polymer with 2,4,6-trichloro-1,3,5-triazine, reaction products with 3-bromo-1-propene, N-butyl-1-butanamine, and N-butyl-2,2,6,6-tetramethyl-4-piperidinamine, oxidized, hydrogenated, CAS number 247243-62-5; or a mixture of any two or more thereof.

In some embodiments, the hindered amine light stabilizers are sterically hindered N—H, N-methyl, N-methoxy, N-propoxy, N-octyloxy, N-cyclohexyloxy, N-acyloxy and N-(2-hydroxy-2-methylpropoxy) analogues of any of the above mentioned compounds. For example, replacing an N—H hindered amine with an N-methyl hindered amine would be employing the N-methyl analogue in place of the N—H.

In some embodiments, the hindered amine light stabilizer is present in the coating compositions provided herein in an amount from about 0.05 to about 20% by weight based on the weight of the coating resin solids. In some embodiments, the amount of the hindered amine light stabilizer present is from about 0.1 to about 10% by weight of the coating resin solids. In some embodiments, the amount of the hindered amine light stabilizer present is from about 0.2 to about 8% by weight of the coating resin solids. In some embodiments, the amount of the hindered amine light stabilizer present is from about 0.5 to about 3% by weight based on the weight of the coating resin solids.

In some embodiments, the coating composition provided herein further includes another ultraviolet light absorber. In some embodiments, the additional ultraviolet light absorber is hydroxyphenylbenzotriazole, a hydroxyphenyl-s-triazine, a benzophenone, an ester of a benzoic acid, an acrylate, a malonate, an oxamide, or a mixture of any two or more thereof. In some embodiments, the additional ultraviolet light absorber is hydroxyphenyl-s-triazine.

In some embodiments, the additional ultraviolet light absorber is a hydroxyphenyl-2H-benzotriazole. Some examples of hydroxyphenyl-2H-benzotriazoles are described in U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905; 4,853,471; 5,268,450; 5,278,314; 5,280,124; 5,319,091; 5,410,071; 5,436,349; 5,516,914; 5,554,760; 5,563,242; 5,574,166; 5,607,987, 5,977,219 and 6,166,218. Other non-limiting examples of hydroxyphenyl-2H-benzotriazoles include 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy)carbonylethyl)-2-hydroxphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumylphenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzo-triazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butyl-phenyl)-2H-benzotriazole, 5-trifluoromethyl-2-(2-hydroxy-3,5-di-t-butylphenyl)-2H-benzo-triazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

In some embodiments, the additional ultraviolet light absorber is a 2-hydroxybenzophenone. Some non-limiting examples of 2-hydroxybenzophenones include 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

In some embodiments, the additional ultraviolet light absorber is an ester of a substituted or unsubstituted benzoic acid. Some non-limiting examples include 4-tert-butylphenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl-3,5-di-tert-butyl-4-hydroxybenzoate, hexadecyl-3,5-di-tert-butyl-4-hydroxybenzoate, octadecyl-3,5-di-tert-butyl-4-hydroxybenzoate, and 2-methyl-4,6-di-tert-butylphenyl 3,5-di-tert-butyl-4-hydroxybenzoate.

In some embodiments, the additional ultraviolet light absorber is an acrylate or a malonate. Some non-limiting examples of an acrylate or a malonate include α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline, SANDUVOR PR25™, dimethyl p-methoxybenzylidenemalonate (CAS #7443-25-6), SANDUVOR PR31™, and di-(1,2,2,6,6-pentamethylpiperidin-4-yl) p-methoxybenzylidenemalonate (CAS #147783-69-5).

In some embodiments, the additional ultraviolet light absorber is an oxamide. Suitable oxamides include but are not limited to 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides, and mixtures of o- and p-ethoxy-disubstituted oxanilides.

In some embodiments, the additional ultraviolet light absorber is a tris-aryl-o-hydroxyphenyl-s-triazine. Some non-limiting examples are described in U.S. Pat. Nos. 3,843,371; 4,619,956; 4,740,542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,736,597; 5,942,626; 5,959,008; 5,998,116; 6,013,704; 6,060,543; 6,242,598 and 6,255,483. Illustrative examples of tris-aryl-o-hydroxyphenyl-s-triazines include but are not limited to 4,6-bis-(2,4-dimethylphenyl)-2-(2-hydroxy-4-octyloxyphenyl)-s-triazine, 4,6-bis-(2,4-dimethylphenyl)-2-(2,4-dihydroxyphenyl)-s-triazine, 2,4-bis[2,4-dihydroxyphenyl)-6-(4-chlorophenyl)-s-triazine, 2,4-bis[2-hydroxy-4-(2-hydroxyethoxy)phenyl]-6-(4-chlorophenyl)-s-triazine, 2,4-bis[2-hydroxy-4-(2-hydroxy-4-(2-hydroxyethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine, 2,4-bis(2,4-dimethylphenyl)-6-[2-hydroxy-4-(3-benzyloxy-2-hydroxypropyloxy)phenyl]-s-triazine, 2,4-bis(2-hydroxy-4-n-butyloxyphenyl)-6-(2,4-di-n-butyloxyphenyl)-s-triazine, 2,4-bis(2,4-dimethylphenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups), methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5',5:5' and 3:3' positions in a 5:4:1 ratio, 2,4,6-tris(2-hydroxy-4-isooctyloxycarbonylisopropylideneoxyphenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis[2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyl]-s-triazine, mixture of 4,6-bis-(2,4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl)-s-triazine, 4,6-bis-(2,4-dimethylphenyl)-2-(2-hydroxy-4-(3-(2-ethylhexyloxy)-2-hydroxypropoxy)-phenyl)-s-triazine, and 4,6-diphenyl-2-(4-hexyloxy-2-hydroxyphenyl)-s-triazine.

In some embodiments, the coating composition provided herein further includes a phenolic antioxidant.

In some embodiments, the phenolic antioxidant includes alkylated monophenols. Illustrative examples include but are not limited to 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, and 2,6-di-tert-butyl-4-methoxymethylphenol. In some embodiments, the alkylated monophenols are nonylphenols which are linear or branched in the side chains. Some non-limiting examples of nonylphenols include 2,6-di-nonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol and mixtures thereof.

In some embodiments, the phenolic antioxidants are alkylthiomethylphenols. Illustrative examples include but are not limited to 2,4-dioctylthiomethyl-6-tert-butylphenol, 2,4-dioctylthiomethyl-6-methylphenol, 2,4-dioctylthiomethyl-6-ethylphenol, and 2,6-di-dodecylthiomethyl-4-nonylphenol.

In some embodiments, the phenolic antioxidants are hydroquinones and alkylated hydroquinones. Illustrative examples include but are not limited to 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, and bis-(3,5-di-tert-butyl-4-hydroxyphenyl) adipate.

In some embodiments, the phenolic antioxidants are tocopherols. Illustrative examples include but are not limited to α-tocopherol, β-tocopherol, γ-tocopherol, δ-tocopherol and mixtures thereof (Vitamin E).

In some embodiments, the phenolic antioxidants are hydroxylated thiodiphenyl ethers. Illustrative examples include but are not limited to 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), and 4,4'-bis(2,6-dimethyl-4-hydroxyphenyl)disulfide.

In some embodiments, the phenolic antioxidants are alkylidenebisphenols. Examples of alkylidenebisphenols include but are not limited to 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α- dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl) butyrate], bis(3-tert-butyl-4-hydroxy-5-methyl-phenyl)dicyclopentadiene, bis[2-(3'tert-butyl-2-hydroxy-5-methylbenzyl)-6-tert-butyl-4-methylphenyl]terephthalate, 1,1-bis-(3, 5-dimethyl-2-hydroxyphenyl)butane, 2,2-bis-(3,5-di-tert-butyl-4-hydroxyphenyl)-propane, 2,2-bis-(5-tert-butyl-4-hydroxy2-methylphenyl)-4-n-dodecylmercaptobutane, and 1,1,5,5-tetra-(5-tert-butyl-4-hydroxy-2-methylphenyl)pentane.

In some embodiments, the phenolic antioxidants are benzyl compounds. Some examples of benzyl compounds include but are not limited to 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, 1,3,5-tri-(3,5-di-tert-butyl-4-hydroxybenzyl)-2,4,6-trimethylbenzene, di-(3,5-di-tert-butyl-4-hydroxybenzyl) sulfide, 3,5-di-tert-butyl-4-hydroxybenzyl-mercapto-acetic acid isooctyl ester, bis-(4-tert-butyl-3-hydroxy-2,6-dimethylbenzyl)dithiol terephthalate, 1,3,5-tris-(3,5-di-tert-butyl-4-hydroxybenzyl) isocyanurate, 1,3,5-tris-(4-tert-butyl-3-hydroxy-2,6-dimethylbenzyl) isocyanurate, 3,5-di-tert-butyl-4-hydroxybenzyl-phosphoric acid dioctadecyl ester and the calcium salt of 3,5-di-tert-butyl-4-hydroxybenzyl-phosphoric acid monoethyl ester.

In some embodiments, the phenolic antioxidants are hydroxybenzylated malonates. Illustrative examples include but are not limited to dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, and bis[4-(1,1,3,3-tetramethylbutyl)phenyl]-2,2-bis(3,5-di-tert-butyl-4-hydroxybenzyl)malonate.

In some embodiments, the phenolic antioxidants are aromatic hydroxybenzyl compounds. Illustrative examples include but are not limited to 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, and 2,4,6-tris(3,5-di-tert-butyl-4-hydroxybenzyl)phenol.

In some embodiments, the phenolic antioxidants are triazine compounds. Illustrative examples include but are not limited to 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl) isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, and 1,3,5-tris(3,5-dicyclohexyl-4-hydroxybenzyl)isocyanurate.

In some embodiments, the phenolic antioxidants are benzylphosphonates. Illustrative examples include but are not limited to dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

In some embodiments, the phenolic antioxidants are acylaminophenols. Illustrative examples include but are not limited to 4-hydroxy-lauric acid anilide, 4-hydroxy-stearic acid anilide, 2,4-bis-octylmercapto-6-(3,5-tert-butyl-4-hydroxyanilino)-s-triazine and octyl-N-(3,5-di-tert-butyl-4-hydroxyphenyl)-carbamate.

In some embodiments, the phenolic antioxidants are esters of β-(3,5-di-tert-butyl-4-hydroxyphenyl)propionic acid with mono- or poly-hydric alcohols, esters of β-(5-tert-butyl-4-hydroxy-3-methylphenyl)propionic acid with mono- or poly-hydric alcohols, esters of β-(3,5-dicyclohexyl-4-hydroxyphenyl)propionic acid with mono- or poly-hydric alcohols, and/or esters of 3,5-di-tert-butyl-4-hydroxyphenyl acetic acid with mono- or poly-hydric alcohols. Examples of mono- or poly-hydric alcohols include but are not limited to methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl)oxamide, 3-thiaundecanol, 3-thiapentadecanol, trimethylhexanediol, trimethylolpropane, and 4-hydroxymethyl-1-phospha-2,6,7-trioxabicyclo[2.2.2]octane.

In some embodiments, the phenolic antioxidants are amides of β-(3,5-di-tert-butyl-4-hydroxyphenyl)propionic acid. Illustrative examples include, but are not limited to, N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl) hydrazide, and N,N'-bis [2-(3-[3,5-di-tert-butyl-4-hydroxyphenyl]propionyloxy) ethyl]oxamide (Naugard® XL-1 supplied by Uniroyal).

In some embodiments, the phenolic antioxidant includes, but is not limited to:
n-octadecyl 3,5-di-tert-butyl-4-hydroxyhydrocinnamate;
neopentanetetrayl tetrakis(3,5-di-tert-butyl-4-hydroxyhydrocinammate;
di-n-octadecyl 3,5-di-tert-butyl-4-hydroxybenzylphosphonate;
1,3,5-tris(3,5-di-tert-butyl-4-hydroxybenzyl)isocyanurate;
thiodiethylene bis(3,5-di-tert-butyl-4-hydroxyhydrocinnamate);
1,3,5-trimethyl-2,4,6-tris(3,5-di-tert-butyl-4-hydroxybenzyl)benzene;
3,6-dioxaoctamethylene bis(3-methyl-5-tert-butyl-4-hydroxyhydrocinnamate;
2,6-di-tert-butyl-p-cresol;
2,2'-ethylidene-bis(4,6-di-tert-butylphenol);
1,3,5-tris(2,6-dimethyl-4-tert-butyl-3-hydroxybenzyl)isocyanurate;
1,1,3,-tris(2-methyl-4-hydroxy-5-tert-butylphenyl)butane;
1,3,5-tris[2-(3,5-di-tert-butyl-4-hydroxyhydrocinnamoyloxy)ethyl]isocyanurate;
3,5-di-(3,5-di-tert-butyl-4-hydroxybenzyl)mesitol;
hexamethylene bis(3,5-di-tert-butyl-4-hydroxyhydrocinnamate);
1-(3,5-di-tert-butyl-4-hydroxyanilino)-3,5-di(octylthio)-s-triazine;
N,N'-hexamethylene-bis(3,5-di-tert-butyl-4-hydroxyhydrocinnamamide);
calcium bis(ethyl 3,5-di-tert-butyl-4-hydroxybenzylphosphonate);
ethylene bis[3,3-di(3-tert-butyl-4-hydroxyphenyl)butyrate];
octyl 3,5-di-tert-butyl-4-hydroxybenzylmercaptoacetate;

bis(3,5-di-tert-butyl-4-hydroxyhydrocinnamoyl)hydrazide; N,N-di-($C_{12}$-$C_{24}$alkyl)-N-methyl-amine oxide; and N,N-dialkylhydroxylamine prepared from di(hydrogenated tallow)amine by direct oxidation.

In some embodiments, the additional ultraviolet light absorber and the phenolic antioxidants are present in the coating compositions provided herein from about 0.01% to about 5% by weight based on the weight of the coating resin solids. In some embodiments, the amount of additional ultraviolet light absorber and phenolic antioxidant present are from about 0.025% to about 2% by weight based on the weight of the coating resin solids. In some embodiments, the amount of additional ultraviolet light absorber and phenolic antioxidant present are from about 0.1% to about 1% by weight based on the weight of the coating resin solids.

In yet other embodiments, the additional ultraviolet light absorber is present at very low levels. In some embodiments, the amount of additional ultraviolet light absorber present is from about 0.05% to about 3% by weight based on the weight of the coating resin solids. In some embodiments, the amount of the additional ultraviolet light absorber present is from about 0.05% to about 0.5% by weight based on the weight of the coating resin solids. In some embodiments, the amount of the additional ultraviolet light absorber present is from about 0.05% to about 0.3% by weight based on the weight of the coating resin solids.

In one aspect, provided herein is a method of stabilizing a coating composition on a substrate toward ultraviolet radiation. The method includes applying the coating composition provided herein to the substrate.

In another aspect, provided herein is a multicoat paint system. The multicoat paint system includes one or more primer layers, one or more pigmented coating layers disposed thereon, one or more transparent coating layers disposed atop the pigmented coating layer. The transparent coating layer includes a transparent coating resin, a triazine ultraviolet light absorber of Formula (I), and, optionally, a hindered amine light stabilizer, wherein the triazine ultralight absorber is covalently linked to the coating resin through $R^1$. In some embodiments, the covalent link between $R^1$ of the triazine ultralight absorber and the transparent coating resin is —$OR^5$, —$NR^5R^5$, —$C(O)N(R^5)_2$, —C(O), —C(O)O, —$C(O)R^5$, —$C(O)OR^5$, —OC(O), or —$OC(O)R^5$.

In some embodiments, the transparent coating resin includes commonly employed transparent coating resins. Illustrative examples include but are not limited to commonly employed aqueous or solventborne transparent coating resins, which may be formulated either as one-component materials, as two-component, or as multicomponent coating materials. Other non-limiting examples include powder slurry clearcoat materials.

In some embodiments, the transparent coating resins may be curable thermally and/or by means of radiation, in particular by means of UV radiation In some embodiments, the transparent coating resin includes at least one binder containing functional groups and also at least one crosslinker having a functionality which is complementary to the functional groups of the binder. Examples of complementary functionalities include but are not limited to carboxyl/epoxy, amine, or thiol; hydroxyl/ blocked or free isocyanate, alkoxylated amino groups, or transesterifiable groups; (meth)acryloyl/CH-acidicamine, hydroxyl, or thiol; carbamate/alkoxylated amino groups, and (meth)acryloyl/(meth)acryloyl.

In some embodiments, the transparent coating resin is based on polyurethane resins and/or polyacrylate resins and/or polyester resins in combination with corresponding crosslinkers. In some embodiments, the polyurethane resin, polyacrylate resin, and/or polyester resin contain hydroxyl, amino, carbamate, carboxyl, (meth)acryloyl and/or thiol groups. In some embodiments, the cross-linkers include but are not limited to isocyanates, amino resins, anhydrides, and the like.

In some embodiments, the transparent coating resins also include customary auxiliaries and additives. Non-limiting examples include crosslinking catalysts, defoamers, adhesion promoters, additives for improving substrate wetting, additives for improving surface smoothness, matting agents, light stabilizers and/or HALS, corrosion inhibitors, biocides, flame retardants or polymerization inhibitors. In some embodiments, the light stabilizer is the triazine UV absorbers of Formula (I) described above. In some embodiments, the light stabilizer is the triazine UV absorbers of Formula (I) with an absorption maximum below 370 nm. In some embodiments, the polymerization inhibitor are those described in "Lackadditive" [Additives for Coatings] by Johan Bieleman, Wiley-VCH, Weinheim, N.Y., 1998.

The multicoat paint systems provided herein are employed in particular in the sector of automotive OEM finishing, but also in the sectors of commercial-vehicle finishing and automotive refinishing, and are used for coating motor vehicle bodies or interior body components or exterior body components. The multicoat paint systems are also suitable, for other sectors, such as for the coating of components for marine and aircraft construction or of components for household and electrical appliances or parts thereof.

In another aspect, provided herein is a clear coating composition which includes oligomers and polymers containing a reactive functionality capable of undergoing a crosslinking reaction and a cross-linking agent.

In some embodiments, the reactive functionality includes but is not limited to primary carbamate groups and functional groups convertible to primary carbamate groups. In some embodiments, the reactive functionality is a carbamate, hydroxyl, amine, acid, epoxy functionalities, and mixtures thereof.

In some embodiments, mixtures of oligomers and polymers may be used.

In some embodiments, the oligomers have a weight average molecular weight of less than or equal to 2000. In some embodiments, the polymers have a molecular weight of greater than 2000. In some embodiments, the oligomers have a molecular weight of between 148 and 2000. In some embodiments, the oligomers have a molecular weight of between 500 and 2000.

In some embodiments, the polymers have a molecular weight of between 2,000 and 20,000. In some embodiments, the polymers have a molecular weight of between 4000 and 6000.

In some embodiments, the oligomers and polymers further contain a triazine ultraviolet light absorber of Formula (I). In some embodiments, the triazine ultraviolet light absorber is covalently linked to the oligomer or polymer through R. In some embodiments, the covalent link between $R^1$ of the triazine ultralight absorber and the coating resin is —OR, —$NR^5R^5$, —$C(O)N(R^5)_2$, —C(O), —C(O)O, —$C(O)R^5$, —$C(O)OR^5$, —OC(O), or —$OC(O)R^5$.

In some embodiments, the crosslinking agent has more than one functional group reactive with the carbamate functionality on the oligomer or polymer. In some embodiments, the cross-linking agent is a monomeric or polymeric melamine formaldehyde resin which is fully or partially alkylated, blocked polyisocyanates, unblocked polyisocyanates, isocyanurate trimers of the blocked and unblocked polyisocyanates, urea resins, alkoxy ureas, polyepoxies, anhydrides, and polysiloxanes.

Molecular weight can be determined by the GPC method using a polystyrene standard. The weights disclosed above are prior to reaction of the oligomer or polymer or mixtures thereof with the ultraviolet light absorber or hindered amine light stabilizer.

In some embodiments, the oligomer or polymer may include the carbamate functionality or the carbamate functionality may be reacted on to the ultraviolet light absorber. The carbamate content of the polymer, on a molecular weight per equivalent of carbamate functionality, will generally be between 200 and 1800, or between 600 and 1800.

One method of preparation of oligomeric compounds having carbamate functionality is to react an alcohol ('alcohol' is defined herein as having one or more OH groups) with more than one urea to form a compound with carbamate groups. This reaction is accomplished by heating a mixture of the alcohol and ureas. This reaction is also performed under heat, and may be performed in the presence of a catalyst.

Another technique is the reaction of an alcohol with cyanic acid to form a compound with primary carbamate groups (i.e., unsubstituted carbamates).

Carbamates may also be prepared by reaction of an alcohol with phosgene and then ammonia to form a compound having primary carbamate groups, or by reaction of an alcohol with phosgene and then a primary amine to form a compound having secondary carbamate groups.

Another approach is to react an isocyanate with a compound such as hydroxypropyl carbamate to form a carbamate-capped isocyanate derivative. In some embodiments, the isocyanate is hexamethylene diisocyanate or isophorone diisocyanate.

Alternatively, the carbamates can be prepared by a transcarbamylation approach where an alcohol is reacted with an alkyl carbamate to form a primary carbamate group-containing compound. In some embodiments, the alkyl carbamate includes but is not limited to methyl carbamate, ethyl carbamate, or butyl carbamate. This reaction is performed under heat, and can be conducted in the presence of a catalyst. One non-limiting example of an organometallic catalyst is dibutyltin dilaurate.

Various alcohols can be used in the preparation of carbamate compounds useful in the present disclosure. In some embodiments, the alcohols have from 1 to 200 carbon atoms or 1-60 carbon atoms. In some embodiments, the alcohols are monofunctional or polyfunctional, aliphatic, aromatic, or cycloaliphatic. In some embodiments, the polyfunctional alcohol has a functionality of 2 to 3. In some embodiments, the alcohol may contain just OH groups, or the alcohol may also contain heteroatoms such as O, S, Si, N, P and other groups such as ester groups, ether groups, amino groups, or unsaturated sites. Non-limiting examples of alcohols include 1,6-hexanediol, 1,2-hexanediol, 2-ethyl-1,3-hexanediol, ethyl-propyl-1,5-pentanediol, 2-methyl-2,4-pentanediol, 2,2,4-trimethyl-1,3-pentanediol, 2,4,7,9-tetramethyl-5-decyn-4,7-diol, 1,3-dihydroxyacetone dimer, 2-butene-1,4-diol, pantothenol, dimethyltartrate, pentaethylene glycol, dimethyl silyl dipropanol, and 2,2'-thiodiethanol.

In some embodiments, the polymer is a carbamate functional acrylic polymer. In some embodiments, the carbamate functional acrylic polymer is represented by the randomly repeating units of the following Formula (III):

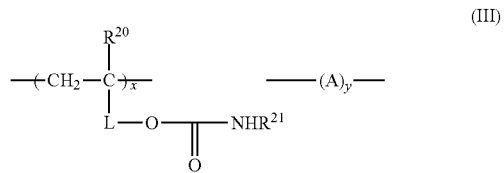

In the above formula, $R^{20}$ represents H or $CH_3$, $R^{21}$ represents H, alkyl or cycloalkyl. In some embodiments, the alkyl is a $C_1$-$C_6$ alkyl. In some embodiments, the cycloalkyl contains 6 ring carbons. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to photo-induced hydrolysis, and should be avoided in locations that would place the ether linkage in the crosslink matrix. The values x and y represent weight percentages, with x being 10 to 90% and y being 10 to 90%. In some embodiments x is 20 to 50%. In some embodiments, y is 50 to 80%.

In Formula (III), A represents repeat units derived from one or more ethylenically unsaturated monomers. Such monomers for copolymerization with acrylic monomers include, but are not limited to, alkyl esters of acrylic or methacrylic acid. Suitable non-limiting examples include ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), vinyl toluene, styrene, styrenic derivatives such as .alpha.-methyl styrene, t-butyl styrene, and the like.

In Formula (III), L represents a divalent linking group. In some embodiments, L may be an aliphatic group of 1 to 8 carbon atoms, cycloaliphatic, or aromatic linking group of 6 to 10 carbon atoms. Illustrative groups for L include, but are not limited to,

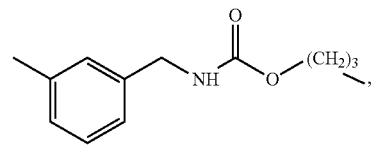

—$(CH_2)$—, —$(CH_2)_2$—, —$(CH_2)_4$—, and the like. In one embodiment, L is represented by —COO-L'- wherein L' is a divalent linking group. Thus, in some embodiments, the polymer is represented by randomly repeating units of the following Formula (IV):

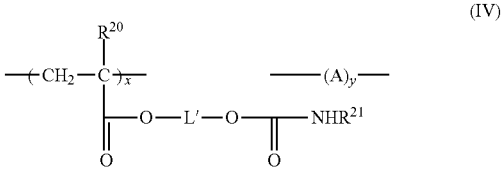

In Formula (IV), R, R', A, x, and y are as defined above. L' may be a divalent aliphatic linking group or a divalent cycloaliphatic linking group. In some embodiments, the divalent aliphatic linking group contains 1-8 carbons atoms. In some embodiments, the divalent aliphatic linking group is —(CH$_2$)—, —(CH$_2$)$_2$—, —(CH$_2$)$_4$—, and the like. In some embodiments, the divalent cycloaliphatic linking group contains up to 8 carbon atoms. In some embodiments, the divalent cycloaliphatic linking group is cyclohexyl and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO-urethane linkage as a residue of the isocyanate group. This carbamate functional acrylic polymer is described in U.S. Pat. No. 5,474,811.

In some embodiments, the carbamate functional acrylic polymer can be prepared by preparing an acrylic monomer having a carbamate functionality in the ester portion of the monomer. Such monomers are described in U.S. Pat. Nos. 3,479,328; 3,674,838; 4,126,747; 4,279,833; and 4,340,497.

Alternatively, the carbamate functional acrylic polymer can also be prepared through reaction of a hydroxy ester with urea to form the carbamyloxy carboxylate. Another method of synthesis involves reacting an α,β-unsaturated acid ester with a hydroxy carbamate ester to form the carbamyloxy carboxylate. Yet another technique involves formation of a hydroxyalkyl carbamate by reacting ammonia, or a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The carbamate acrylic monomer can then be polymerized along with other ethylenically-unsaturated monomers, if desired.

An alternative route for preparing a carbamate functional acrylic polymer is to react an already-formed polymer such as an acrylic polymer with another component to form a carbamate-functional group appended to the polymer backbone, as described in U.S. Pat. No. 4,758,632.

One technique for preparing the carbamate functional acrylic polymers involves thermally decomposing urea (to give off ammonia and HNCO) in the presence of a hydroxy-functional acrylic polymer or copolymer to form a carbamate-functional acrylic polymer. Another technique involves reacting the hydroxyl group of a hydroxyalkyl carbamate with the isocyanate group of an isocyanate-functional acrylic or vinyl monomer to form the carbamate functional acrylic polymer.

Isocyanate-functional acrylics are described, for example, in U.S. Pat. No. 4,301,257. Isocyanate vinyl monomers include unsaturated m-tetramethyl xylene isocyanate (sold by American Cyanamid as TMI®).

Yet another technique to prepare the carbamate functional acrylic polymer is to react a cyclic carbonate group on a cyclic carbonate-functional acrylic with ammonia in order to form the carbamate-functional acrylic. Cyclic carbonate-functional acrylic polymers are described, for example, in U.S. Pat. No. 2,979,514.

A more difficult, but feasible way of preparing the carbamate functional acrylic polymer would be to trans-esterify an acrylate polymer with a hydroxyalkyl carbamate.

The coating compositions provided herein may also include a durability enhancing agent containing a monomeric, oligomeric, or polymeric component having bonded thereto at least one HALS and/or UVA, said durability enhancing agent having appended thereto more than one carbamate functional group, or group convertible to a carbamate functional group. In some embodiments, the durability enhancing agent may also include other reactive functionality that may be crosslinked into the coating composition. Examples of other reactive functionalities include but are not limited to acid, epoxy, hydroxy, ester and ether functionality. In some embodiments, the HALS or UVA may be reacted via a grafting reaction or copolymerized in an addition reaction.

In some embodiments, the durability enhancing agent includes the reaction product of an acrylic polymer or acrylic oligomer that is carbamate functional or has functionality convertible to carbamate functionality, including those that can act as grafting sites for UVA or HALS compounds. A non-limiting example is a reaction of 2-carbamate ethyl methacrylate with either a Norblock and/or TMI, followed by reaction with a hydroxyl functional UVA or HALS. Other monomers may be also included in the reaction. Other carbamates such as those listed in U.S. Pat. Nos. 5,356,669 and 5,474,811 may also be used.

In some embodiments, the durability enhancing agent may include the coating resin of the coating composition, or may be added as a separate component to the coating composition provided herein.

In some embodiments, the coating compositions provided herein are cured by self cross-linking or by reaction of the coating resin with a crosslinking agent having a plurality of functional groups that are reactive with the crosslinkable groups on the coating resin. Non-limiting examples of the reactive functional groups include active methylol or methylalkoxy groups on aminoplast crosslinking agents or on other compounds such as phenol/formaldehyde adducts, isocyanate groups, siloxane groups, cyclic carbonate groups, and anhydride groups.

Non-limiting examples of crosslinking agents include melamine formaldehyde resin (including monomeric or polymeric melamine resin and partially or fully alkylated melamine resin), blocked or unblocked polyisocyanates, aminoplast resin, or urea formaldehyde resin.

In some embodiments, the blocked or unblocked polyisocyanate include but are not limited to toluene diisocyanate (TDI), methylene diphenyl diisocyanate (MDI), isophorone diisocyanate, hexamethylene diisocyanate, and isocyanurate trimers of each of the foregoing. In some embodiments, the polyisocyanate is blocked with alcohols or oximes. In some embodiments, the alcohol or oxime is a triazine benzotriazole, a 2-hydroxybenzophenone compound, an oxanilide, and mixtures thereof.

In some embodiments, the aminoplast resin is a melamine formaldehyde resin. In some embodiments, the aminoplast resin is a monomeric or polymeric melamine formaldehyde resin, an alkoxylated melamine formaldehyde resin and mixtures of alkoxylated melamine formaldehyde resins.

In some embodiments, the aminoplast resin is reacted with a carbamate functionality, or a functionality convertible to a carbamate. In some embodiments, the resulting excess aminoplast groups crosslink with the reactive functionality on the coating resin.

In some embodiments, the clearcoat composition may be used alone or with a pigmented basecoat composition.

In some embodiments, the oligomer-bound or polymer-bound HALS and/or UVA is used in any layer of the multi-layer coating composition provided herein. In some embodiments, the oligomer-bound or polymer-bound HALS and/or UVA is used in the clearcoat composition provided herein.

The clearcoat composition provided herein produces a crosslinked film that exhibits improved resistance to color change and gloss retention.

The coating compositions provided herein exhibit enhanced durability and superior exterior weathering performance.

In another aspect, a durability enhancing agent is provided that includes the reaction product of a) ultraviolet light absorbers (UVA) and mixtures thereof having a reactive functionality thereon; and b) a non-acrylic monomeric, oligomeric or polymeric component, having a reactive functionality thereon to react with the reactive functionality of a), wherein either a) or b) includes more than one carbamate functional group, group convertible to a carbamate group, or a group that crosslinks with a carbamate functional group, and the final product is a polymer with a covalently bound UVA that includes more than one carbamate functional group, group convertible to a carbamate group, or a group that crosslinks with a carbamate functional group, wherein the UVA is a triazine UV absorber of Formula (I)

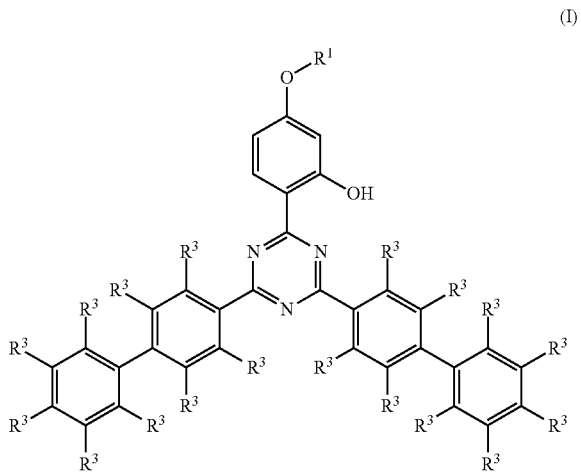

(I)

wherein:

$R^1$ is $C_1$-$C_{18}$ straight chain alkyl, $C_3$-$C_{18}$ branched chain alkyl or a 5-12 membered cycloalkyl, wherein each of the $C_1$-$C_{18}$ straight chain alkyl, $C_3$-$C_{18}$ branched chain alkyl and the 5-12 membered cycloalkyl is substituted with one or more of —$OR^5$, —$NR^5R^5$, —$C(O)N(R^5)_2$, —$C(O)$, —$C(O)O$, —$C(O)R^5$, —$C(O)OR^5$, —$OC(O)$, —NCO—, or —OC(O)$R^5$; or said alkyl or said cycloalkyl interrupted by one to four epoxy, —O—, —$NR^5$—, —$CONR^5$—, —COO—, —OCO—, —CO—, —$C(R^5)$=$C(R^5)$COO—, —OCOC($R^5$)=$C(R^5)$—, —$C(R^5)$=$C(R^5)$—, phenylene or phenylene-G-phenylene in which G is —O—, —S—, —$SO_2$—, —$CH_2$— or —$C(CH_3)_2$— or combinations thereof, or said alkyl or said cycloalkyl both substituted and interrupted by combinations of the groups mentioned above; each $R^5$ is independently H, $C_1$-$C_{24}$ straight or branched chain alkyl, $C_2$-$C_{24}$ alkenyl, $C_6$-$C_{10}$ aryl, or a 5-12 membered cycloalkyl; each $R^3$ is independently H, cyano, halo, a $C_1$-$C_{10}$ alkyl, a $C_1$-$C_{10}$ alkoxy, a 5-12 membered cycloalkyl, —$C(O)R^{15}$, —$C(O)(O)R^{15}$, or —$C(O)NR^{15}R^{15}$; each $R^{15}$ is independently H or $C_1$-$C_8$ alkyl; and wherein the triazine ultraviolet light absorber of Formula (I) is covalently linked to the coating resin through $R^1$, wherein the covalent link is between the coating resin and the one or more —$OR^5$, —$NR^5R^5$, —$C(O)N(R^5)_2$, —$C(O)$, —$C(O)O$, —$C(O)R^5$, —$C(O)OR^5$, —$OC(O)$, or —$OC(O)R^5$ of $R^1$.

In another aspect a curable coating composition is provided that includes a durability enhancing agent comprising the reaction product of a) a compound that is a triazine UV absorber of Formula (I), said compound having a reactive functionality thereon, b) a monomeric, oligomeric, or polymeric component, having a reactive functionality thereon to react with the reactive functionality of a), wherein the final product includes at least one carbamate functional group, group convertible to a carbamate group, or group that crosslinks with a carbamate functional group.

In another aspect, a durability enhancing agent is provided wherein the monomeric, oligomeric or polymeric component includes the reaction product of a carbamate having residual —NCO— reactive functionality, polyol, and a UVA having a reactive functionality selected from the group consisting of hydroxyl, amine, isocyanate and epoxy functionalities. The durability enhancing agent may include the polymer comprising the reaction product of polyurethane having carbamate functionality, and a UVA having at least one reactive functionality selected from the group consisting of amine, hydroxyl, epoxy and isocyanate functionality. In some embodiments, the durability enhancing agent may include the polymeric component that includes the reaction product of an oligomeric or polymeric ester having carbamate functionality and the UVA comprises reactive functionality selected from the group consisting of ester, ether, hydroxy, acid and epoxy functionalities. In another embodiment, the durability enhancing agent may include where the monomer, oligomer or polymer is selected from the group consisting of ether, ester, alkyd, epoxy, urethane, urea, amide, silane, isocyanate, and aminoplast oligomeric and polymeric compositions, and mixtures thereof.

In another aspect a curable coating composition is provided that includes (a) a durability enhancing agent having reactive functionality thereon comprising the reaction product of, (i) compounds selected from the group consisting of hydroxyphenyl triazine ultraviolet light absorbers of formula (I), and (ii) a monomeric, oligomeric or polymeric component, having reactive functionality thereon to react with the reactive functionality of (i) wherein either component (i) or (ii) have more than one carbamate functional group, group convertible to a carbamate group, or a group that crosslinks with a carbamate functional group, (b) an additional oligomeric or polymeric resin comprising crosslinkable functional groups, and (c) a crosslinking agent having reactive functionality that is reactive with said crosslinkable functional groups on the durability enhancing agent and on the additional oligomer or polymer. In the coating composition, component a) may include a polymer having appended thereto at least one functional group selected from the group consisting of carbamate and carbamate convertible groups, said polymers having a molecular weight greater than 2000. In the coating composition, the crosslinking agent may be a monomeric or polymeric melamine formaldehyde resin that is fully or partially alkylated, blocked polyisocyanates, unblocked polyisocyanates, isocyanurate trimers of blocked and unblocked polyisocyanates, urea, alkoxy urea, polyanhydrides, polyepoxy and polysiloxane resins.

In another aspect, a durability enhancing agent may include a monomer or oligomer that has appended thereto more than one functional group that is a carbamate group, or a group convertible to carbamate, and having a molecular weight of between 148 and 2000.

In another aspect, a coating composition is provided that includes a) oligomers and polymers having thereon, a reactive functionally capable of undergoing a crosslinking reaction, wherein the reactive functionality comprises at least one functional group selected from the group consisting of primary carbamate groups, and functional groups convertible to primary carbamate groups, said oligomers having a weight average molecular weight of less than or equal to 2000 and said polymers having a molecular weight of greater than 2000, and mixtures of said polymers and oligomers, b) a crosslinking agent having more than one functional group reactive with the carbamate functionality on component a), wherein component a) further comprises at least one ultraviolet light absorbing compound of Formula (I), wherein a crosslinked film formed from the cured coating composition demonstrates resistance to color change and gloss retention. In some embodiments, the crosslinking agent is a monomeric or a polymeric melamine formaldehyde resin which is fully or partially alkylated, a blocked polyisocyanate, an unblocked polyisocyanate, an isocyanurate trimer of the blocked and unblocked polyisocyanate, a urea resin, an alkoxy urea, a polyepoxy, an anhydride, and a polysiloxane. In some embodiments, the reactive functionality capable of undergoing crosslinking is a carbamate, hydroxyl, amine, acid, epoxy, or a mixture of any two or more thereof.

In another aspect, a composition is provided that includes a) a polymer backbone having appended thereto more than one carbamate functional group, said polymer being represented by randomly repeating units according formula (III):

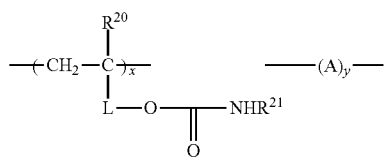

(III)

wherein $R^{20}$ represents H, or $CH_3$; $R^{21}$ represents H; L represents a divalent linking group selected from the group consisting of an aliphatic group of 1 to 8 carbon atoms, cycloaliphatic and aromatic linking groups of 6 to 10 carbon atoms, and NHC(O)O—; A represents repeat units derived from one or more ethylenically unsaturated monomers; X represents 10 to 90 weight percent; and Y represents 10 to 90 weight percent.

In another aspect, a curable coating composition is provided that includes A) an oligomeric or polymeric resin comprising crosslinkable functional groups wherein said oligomer or polymeric resin is selected from the group consisting of esters, ethers, polyols, epoxy, alkyd, urethane urea, acrylic, and polyamide, oligomers and polymers and mixtures thereof, and B) a crosslinking agent comprising the reaction product of a) durability enhancing agents selected from triazine ultraviolet light absorbers (UVAs) of formula (I) and mixtures thereof, where a) comprises more than one primary carbamate reactive functionality and b) crosslinking compounds selected from the group consisting of aminoplast, blocked and unblocked polyisocyanates, isocyanurate trimers of the polyisocyanates, urea resins, alkoxy ureas, polyanhydrides, polyepoxies and polysiloxanes.

In another aspect, a coating composition is provided where the crosslinking compound is a monomeric or polymeric melamine formaldehyde resin which is fully or partially alkylated. In the coating composition, the crosslinking compound may include a polyisocyanate or the isocyanurate trimer thereof, or is a reactive group that is an amine, primary carbamate or hydroxyl.

In another aspect, a curable coating composition is provided that includes A) an oligomeric or polymeric resin comprising crosslinkable functional groups wherein said oligomer or polymeric resin is selected from the group consisting of esters, ethers, polyols, epoxy, alkyd, urethane urea, acrylic, and polyamide, oligomers and polymers and mixtures thereof, and B) a crosslinking agent comprising thereon a durability enhancing agent and functionality reactive with the crosslinkable functional groups of A), wherein component B) is the reaction product of a) compounds selected from triazine ultraviolet light absorbers of formula (I) and mixtures thereof, said compounds having more than one primary carbamate reactive functionality thereon to react with component (b), where component b) is a monomeric, oligomeric or polymeric component selected from the group consisting of aminoplast compounds which are fully or partially alkylated.

The present disclosure, thus generally described, will be understood more readily by reference to the following examples, which are provided by way of illustration and are not intended to be limiting of the present invention.

EXAMPLES

Example 1. 2-[4,6-bis(4-phenylphenyl)-1,3,5-triazin-2-yl]-5-(2-hydroxypropoxy)phenol ("UVA-1") and 2-[4,6-bis(4-phenylphenyl)-1,3,5-triazin-2-yl]-5-(2-hydroxy-1-methyl-ethoxy)phenol ("UVA-2"). 4-[4,6-Bis(4-phenylphenyl)-1,3,5-triazin-2-yl]benzene-1,3-diol (WO96/28431, Compound 115, 100 grams, 0.2 mole), propylene carbonate (21.72 grams, 0.21 mole), potassium carbonate (29.4 grams, 0.21 mole), and N,N-dimethylformamide (200 grams) were added to a reaction flask equipped with the necessary auxilary equipment. Under a nitrogen blanket, the reactor contents were heated to 160° C. for two hours followed by heating to 180° C. for a period of 3 hours. The reactor contents were cooled to ambient temperature and any undissolved solids were removed by filtration. N,N-Dimethylformamide was removed by vacuum distillation and the resulting reaction mass dissolved in 900 grams of methylamylketone. The resulting solution was neutralized by washing once with dilute aqueous hydrochloric acid followed by clarification of the methylamylketone layer by vacuum filtration. The solution was then treated with adsorbing clay and heated to reflux for one hour after which the solution was cooled to ambient temperature. The clay was removed by vacuum filtration followed by vacuum distillation of the solvent. The title compound mixture was obtained as a yellow solid (56.4 grams, 50% yield) with a melting range of 98.4-105.2° C. The $^1$H NMR ($d_6$-DMSO/$C_6D_6$) indicated the instant compound mixture was 50% UVA-1 and 50% UVA-2. The following Formula X is the structure of UVA-1 ($R^a$=H, $R^b$=Me) and -2 ($R^a$=Me, $R^b$=H).

Formula X

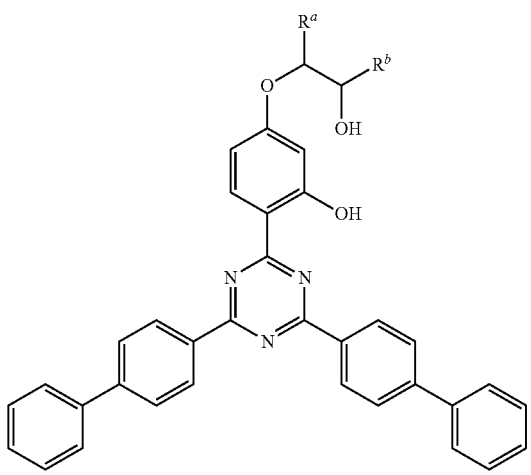

Example 2. [3-[4-[4,6-bis(4-phenylphenyl)-1,3,5-triazin-2-yl]-3-hydroxy-phenoxy]-2-hydroxy-propyl]neo-decanoate ("UVA-3") and [2-[4-[4,6-bis(4-phenylphenyl)-1,3,5-triazin-2-yl]-3-hydroxy-phenoxy]-3-hydroxy-propyl]neo-decanoate ("UVA-4"). 4-[4,6-bis(4-phenylphenyl)-1,3,5-triazin-2-yl]benzene-1,3-diol (WO96/28431, Compound 115, 300 grams, 0.6 mole), Cardura E-10P (155.7 grams, 0.63 mole), potassium carbonate (29.4 grams, 0.63 mole), and N,N-Dimethylformamide (600 grams) were added to a reaction flask equipped with the necessary auxilary equipment. Under a nitrogen blanket, the reactor contents were heated to 160° C. for two hours followed by heating to 160° C. for a period of 6 hours. The reactor contents were cooled to ambient temperature and any undissolved solids removed by filtration. N,N-Dimethylformamide was removed by vacuum distillation and the resulting reaction mass dissolved in 3425 grams of methylamylketone. The resulting solution was neutralized by washing once with dilute aqueous hydrochloric acid followed by clarification of the methylamylketone layer by vacuum filtration. The solution was then treated with adsorbing clay (BASF F72FF, 120 grams) and heated to reflux for one hour, after which the solution was cooled to ambient temperature. The clay was removed by vacuum filtration followed by vacuum distillation of the solvent. The title compound mixture was obtained as a waxy yellow solid (273 grams, 60% yield). The compound was dissolved in DMSO-D6/C6D6 and $^1$H NMR analysis was completed using the Unity INOVA 500 MHZ instrument indicated the instant compound mixture was 80% UVA-3 and 20% UVA-4. Formula X, above, represents UVA-3, where $R^a$ is H and R is —CH$_2$OC(O)(neo-C$_9$H$_{19}$), and UVA-4, where $R^a$ is —CH$_2$OC(O)(neo-C$_9$H$_{19}$) and R is H. The mixture is used below and is referred to as UVA-3/4.

Example 3 (Comparative). 2-[4,6-bis(2,4-dimethylphenyl)-1,3,5-triazin-2-yl]-5-[2-hydroxy-3-(2-methylbutoxy)propoxy]phenol and regioisomer. The title compound(s) was synthesized based on the procedures disclosed in U.S. Pat. No. 5,736,597, Table 1, Compound 7. The melting point of the compound mixture was 73-77° C. The $^1$H NMR analysis indicated that the compound was a mixture of 98% of 2-[4,6-bis(2,4-dimethylphenyl)-1,3,5-triazin-2-yl]-5-[2-hydroxy-3-(2-methylbutoxy)propoxy]phenol (following formula where $R^c$ is H and $R^d$ is —CH$_2$OCH$_2$CH(CH$_2$CH$_3$)(CH$_2$CH$_2$CH$_2$CH$_3$)) and 2% of 2-[4,6-bis(2,4-dimethylphenyl)-1,3,5-triazin-2-yl]-5-[1-(hydroxymethyl)-2-(2-methylbutoxy)ethoxy]phenol (following formula where $R^c$ is —CH$_2$OCH$_2$CH(CH$_2$CH$_3$)(CH$_2$CH$_2$CH$_2$CH$_3$) and $R^d$ is H).

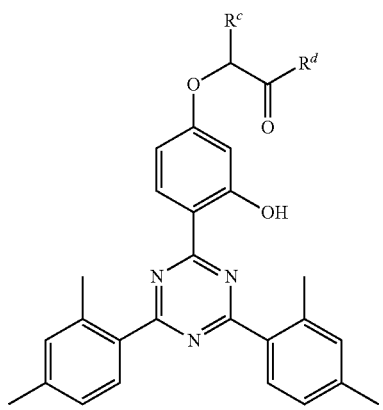

Example 4 (Comparative). 2-Isooctyl 2-[4-[4,6-bis(4-phenylphenyl)-1,3,5-triazin-2-yl]-3-hydroxy-phenoxy]propanoate. The compound was prepared based on the procedure disclosed in U.S. Pat. No. 6,060,543, Example A14. The yellow powder had a melting point of 60-70° C.

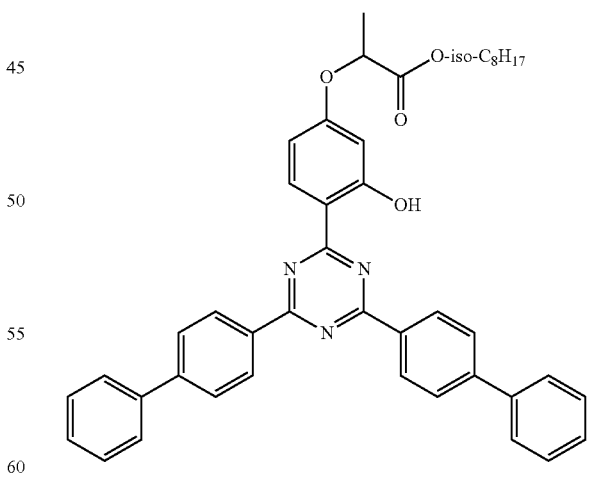

Example 5 (Comparative). 2-[4,6-Bis(4-phenylphenyl)-1,3,5-triazin-2-yl]-5-(2-ethylhexoxy)phenol. The title compound was prepared based on the procedure disclosed in U.S. Pat. No. 6,060,543, Example A8. The yellow powder had a melting point of 63-70° C.

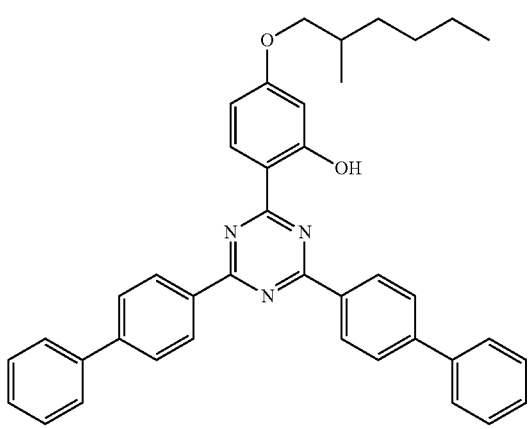 [SMILES: CCCCC(C)COc1ccc(-c2nc(-c3ccc(-c4ccccc4)cc3)nc(-c3ccc(-c4ccccc4)cc3)n2)c(O)c1]

Example 6 (Comparative). Mixture of β-[3-(2-H-Benzotriazole-2-yl)-4-hydroxy-5-tert.butylphenyl]-propionic acid-poly(ethylene glycol) 300-ester, and Bis{β-[3-(2-H-Benzotriazole-2-yl)-4-hydroxy-5tert.butylphenyl]-propionic acid}-poly(ethylene glycol) 300-ester. The title compound mixture is a commercial benzotriazole UV absorber.

Example 7 (Comparative). 2-(2H-Benzotriazol-2-yl)-6-(1-methyl-1-phenylethyl)-4-(1, 1, 3, 3-tetramethylbutyl) phenol. The title compound is a commercial benzotriazole UV absorber.

Example 8. UV Absorber Solubility in UV Curable Coating Compositions. To measure this solubility, a number of structurally different UV absorbers were added to a typical UV curable coating composition similar to that as described by D. B. Pourreau "UV-Curable Acrylic Urethane Clearcoats for Automotive Applications," RadTech Report, November/December, 2004, Table 5, p. 66. The test UV absorber was added to the UV curable coating composition at various concentrations. The resulting solution was placed into individual containers and sealed. Solubility was then evaluated based upon observed crystallization in the solvent. Observations started after several hours and then continued over a period of several weeks.

The solubility values given in Table 1, below, are approximate maximum concentrations where no sign of subsequent crystallization was evident. Solubilities are reported in weight percent of total UV absorber added to UV curable coating formulation. From the data in Table 1, it is clear that the inventive triazine UV absorbers are considerably more soluble in UV curable coating formulations than other triazine UV absorbers of the prior art. The use of many UV absorbers in coatings has been limited by solubility and compatibility of some UV absorber compounds. By using the inventive triazine UV absorbers, the loading levels can be increased substantially to increase stabilization protection which is further augmented by the photostability of the inventive UV absorbers.

TABLE 1

| UV Absorber | Solubility in UV Curable Coating |
| --- | --- |
| Example 2 | 6.4 wt % |
| Example 4 (Comparative) | 0 wt % |
| Example 3 (Comparative) | 2 wt % |

Example 9. UV Absorber Solubility in UV Curable Coating Compositions. To measure this solubility, a number of structurally different UV absorbers were added to a typical UV curable coating composition similar to that as described by D. B. Pourreau "UV-Curable Acrylic Urethane Clearcoats for Automotive Applications," RadTech Report, November/December, 2004, Table 6, p. 68. The test UV absorber was added to the UV curable coating composition at various concentrations. The resulting solution was placed into individual containers and sealed. Solubility was then evaluated based upon observed crystallization in the solvent. Observations were initiated after several hours and continued over a period of several weeks.

The solubility values given in Table 2, below, are approximate maximum concentrations where no sign of subsequent crystallization is evident. Solubilities are reported in weight percent of total UV absorber added to UV curable coating formulation. From the data, it is clear that the instant triazine UV absorbers are considerably more soluble in UV curable coating formulations compared to other, triazine UV absorbers. The use of many UV absorbers in coatings has been limited in the past by the limited solubility and compatibility of some UV absorber compounds. By using the instant triazine UV absorbers, the use levels can be increased substantially to add greatly increased stabilization protection which is further augmented by the photostability of the instant UV absorbers.

TABLE 2

| UV Absorber | Solubility in UV Curable Coating |
| --- | --- |
| Example 2 | 26 wt % |
| Example 5 (Comparative) | 2.4 wt % |

Example 10. Stabilized 2-Part Solvent-borne Polyurethane Glossy Clear Top Coat. A glossy stabilized clear top coat was prepared of the formulation below. The UV absorbers were added to the formulation at 2.5 wt % relative to total resin solids.

TABLE 3

| Component | Parts by Weight |
| --- | --- |
| Part A | |
| Joncryl 500 | 468.5 |
| Irgaflow 110 | 0.80 |
| Methylamylketone (MAK) | 171.1 |
| Dibutyltin dilaureate (1% in MAK) | 5.0 |
| [UV Absorber] | 14.1 |
| Part B | |
| Basonat HI 100 | 194.6 |

Joncryl 500 is a low VOC acrylic polyol, hydroxyl number is 135-150, from BASF. Basonat HI 100 is a solvent-free, aliphatic polyisocyanate, NCO equivalent weight is 191 g/mol, from BASF.

Example 11. Stabilized 2-Part Solvent-borne Polyurethane Glossy Clear Top Coat. A glossy stabilized clear top coat was prepared of the formulation below. The UV absorber was added at 2.5 wt % relative to total resin solids, and the hindered amine light stabilizer (HALS) was added at 1.5 wt % relative to total resin solids. The HALS was a mixture of bis(1,2,2,6,6-pentamethyl-4-piperidyl) sebacate and methyl-1,2,2,6,6-pentamethyl-4-piperidyl sebacate ("HALS 1"); bis(1-octyloxy-2,2,6,6-tetramethylpiperidin-4-yl) sebacate ("HALS 2"); or 2,4-bis[(1-cyclohexyloxy-2,2,6,6-tetramethylpiperidin-4-yl)butylamino]-6-(2-hydroxyethylamino-s-triazine ("HALS 3").

TABLE 4

| Component | Parts by Weight |
|---|---|
| Part A | |
| Joncryl 500 | 468.5 |
| Irgaflow 110 | 0.80 |
| Methylamylketone (MAK) | 171.1 |
| Dibutyltin dilaureate (1% in MAK) | 5.0 |
| HALS | 8.47 |
| [UV Absorber] | 14.1 |
| Part B | |
| Basonat HI 100 | 194.6 |

Example 12. Multilayered Coated Panel Preparation. Aluminum test panels from ACT Test Panels LLC were purchased having a white base coat (coil coat) and no clear top coat. The panels were cut to a size of about 3 inches by 6 inches. The stabilized top coats of Examples 10 and 11 were applied to the painted test panels using draw down bars to obtain clear coat thicknesses of either 2 mils or 3 mils, wherein 1 mil is equal to 0.0254 mm or 25.4 microns. The panels were allowed to air dry for 2 days followed by oven curing at 60° C. for 60 minutes. Initial CIE Lab color values, 20 degree gloss, and 60 degree gloss were measured.

Example 13. Multilayered Coated Panels, Accelerated Weathering. The painted panels prepared in Example 12 were weathered in a Xenon Arc Weather-Ometer with a controlled irradiance at 6500 W, using inner quartz and outer borosilicate S-type filter, of SAE J2527. The irradiation cycle was: 40 minutes of straight irradiation with no water spray, followed by 20 minutes of light plus front spray, followed by 60 minutes of light irradiation and finally by 60 minutes dart plus rear spray (condensation). The setting was 0.55 W/M² at 340 nm, 1.98 kJ/hour. In the light cycle, the black panel temperature was controlled at 702° C. The relative humidity in the light cycle was in the range of 50-55%, and in the dark cycle 100%. After 3536 hours of accelerated weathering, the following results were obtained with regard to 20 degree gloss retention:

TABLE 5

| UV Absorber | 20% Gloss Retention (%) |
|---|---|
| No UVA or HALS | 65.4 |
| Example 1 | 85.2 |
| Example 3 (Comparative) | 69.9 |
| Example 4(Comparative) | 78.8 |

The instant UV absorbers gave a greater coating gloss retention than the UV absorbers of the prior art which is highly desirable.

Example 14. Multilayered Coated Panels, Accelerated Weathering. The painted panels prepared in Example 12 were weathered in a Xenon Arc Weather-Ometer with a controlled irradiance at 6500 W, using inner quartz and outer borosilicate S-type filter, of SAE J2527. The irradiation cycle was: 40 minutes of straight irradiation with no water spray, followed by 20 minutes of light plus front spray, followed by 60 minutes of light irradiation and finally by 60 minutes dart plus rear spray (condensation). The setting was 0.55 W/M² at 340 nm, 1.98 kJ/hour. In the light cycle, the black panel temperature was controlled at 702° C. The relative humidity in the light cycle was in the range of 50-55%, and in the dark cycle 100%.

Initial color measurements were taken using the above parameters. The L, a, and b values were calculated using the CIE system from the reflectance values. ΔE was calculated from the L, a, and b values. Subsequent measurements were taken at specified intervals. ΔL, a, and b values were the difference between the initial values and the values at each interval. ΔE was calculated as follows:

$$[(\Delta L)^2 + (\Delta a)^2 + (\Delta b)^2]^{1/2} = \Delta E.$$

After 6000 hours of accelerated weathering of the cycle above, the following results were obtained with regard to color change (ΔE):

TABLE 6

| UV Absorber | Delta E |
|---|---|
| No UVA or HALS | Coating failed/delaminated after 3500 hours. |
| Example 1 | 1.70 |
| Example 2 | 1.89 |
| Example 3 (Comparative) | 2.68 |
| Example 4 (Comparative) | 3.78 |
| Example 5(Comparative) | 2.79 |

The instant UV absorbers exhibited lower color change during weathering than the UV absorbers of the prior art which is highly desirable.

Example 15. Multilayered Coating. The instant UV absorbers were added to Examples 1.1 to 1.7 of U.S. Pat. No. 8,535,795. The resulting UV stabilized coatings exhibited outstanding photostability with regard to resistance to color change and gloss retention.

Example 16. [3-[4-[4,6-bis(4-phenylphenyl)-1,3,5-triazin-2-yl]-3-hydroxy-phenoxy]-2-[5-[[6-isocyanatohexyl (6-isocyanatohexylcarbamoyl)carbamoyl]amino]pentyl-carbamoyloxy]propyl] neodecanoate (an isocyanate-functional covalently-bound triazine UV absorber (bound through the phenolic hydroxyl) oligomer)

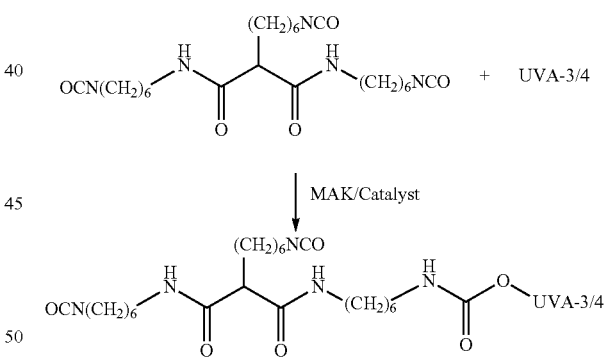

To a room temperature (20° C.) solution of 50 parts urethane grade methyl n-amyl ketone, 25 grams of 1,3-bis (6-isocyanatohexyl)-1-(6-isocyanatohexylcarbamoyl)urea (molecular weight=478.2 g/mole, 0.052 mole, Basonat HB 100, available from BASF) and 0.05 parts of dibutyl tin dilaurate kept under an inert nitrogen atmosphere was added over two hours a solution of 50 grams of urethane grade methyl n-amyl ketone (MAK) and 12.95 grams of the triazine UV absorber mixture of Instant Example 2 (0.017 mole). During the addition of the triazine UV absorber solution, the temperature of the reaction batch was not allowed to go above 36° C. After the addition of triazine UV absorber solution was complete, the reaction temperature was kept below 40° C. for seven hours and was followed by NCO titration. The title triazine UV absorber was obtained as a light yellow solution and was covalently attached to the isocyanate molecule. The final product assay was 27.1% solids with an equivalent weight of 593 grams/equivalent.

Example 17. [3-[4-[4,6-bis(4-phenylphenyl)-1,3,5-triazin-2-yl]-3-hydroxy-phenoxy]-2-[6-[[6-[[1-[[4-[4,6-bis(4-phenylphenyl)-1,3,5-triazin-2-yl]-3-hydroxy-phenoxy]methyl]-2-(neodecanoyl)oxy-ethoxy]carbonylamino]hexylcarbamoyl-(6-isocyanatohexyl)-carbamoyl]amino]hexylcarbamoyloxy]propyl] neodecanoate (e.g. an isocyanate-functional covalently-bound triazine UV absorber (bound through the phenolic hydroxyl) oligomer).

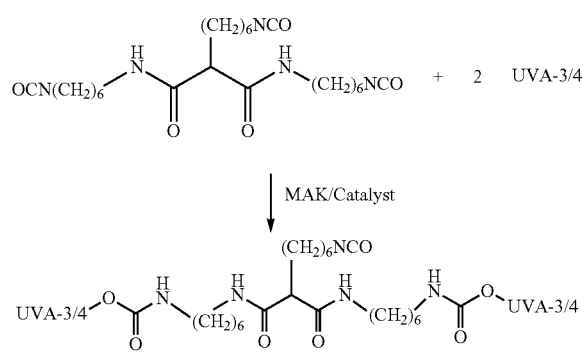

To a room temperature (20° C.) solution of 50 parts urethane grade methyl n-amyl ketone, 12.5 grams of 1,3-bis(6-isocyanatohexyl)-1-(6-isocyanatohexylcarbamoyl) urea (molecular weight=478.2 g/mole, 0.026 mole, Basonat HB 100, available from BASF) and 0.05 parts of dibutyl tin dilaurate kept under an inert nitrogen atmosphere was added over two hours a solution of 50 grams of urethane grade methyl n-amyl ketone and 12.95 grams of the triazine UV absorber mixture of Instant Example 2 (0.017 mole). During the addition of the triazine UV absorber solution, the temperature of the reaction batch was not allowed to go above 36° C. After the addition of triazine UV absorber solution was complete, the reaction temperature was kept below 40° C. for seven hours and was followed by NCO titration. The title triazine UV absorber was obtained as a light yellow solution and was covalently attached to the isocyanate molecule. The final product assay was 20.1 percent solids with equivalent weight of 1894 grams/equivalent.

Example 18. [2-[6-[3,5-bis(6-isocyanatohexyl)-2,4,6-trioxo-1,3,5-triazinan-1-yl]hexylcarbamoyloxy]-3-[4-[4,6-bis(4-phenylphenyl)-1,3,5-triazin-2-yl]-3-hydroxy-phenoxy] propyl] neodecanoate (e.g. an isocyanate-functional covalently-bound triazine UV absorber (bound through the phenolic hydroxyl) oligomer).

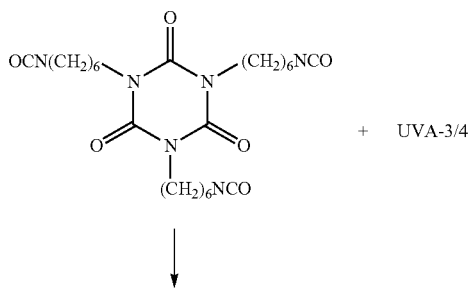

-continued

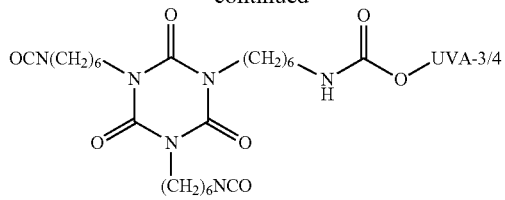

To a room temperature (20° C.) solution of 50 parts urethane grade methyl n-amyl ketone, 25 grams of 1,3,5-tris(6-isocyanatohexyl)-1,3,5-triazinane-2,4,6-trione (molecular weight=504.6 g/mole, 0.0495 mole, Basonat HI 100, available from BASF) and 0.05 parts of dibutyl tin dilaurate kept under an inert nitrogen atmosphere was added over two hours a solution of 50 grams of urethane grade methyl n-amyl ketone and 12.3 grams of the triazine UV absorber mixture of Instant Example 2 (0.0165 mole). During the addition of the triazine UV absorber solution, the temperature of the reaction batch was not allowed to go above 36° C. After the addition of triazine UV absorber solution was complete, the reaction temperature was kept below 40° C. for seven hours and was followed by NCO titration. The title triazine UV absorber was obtained as a light yellow solution and is covalently attached to the isocyanate molecule. The final product assay was 26.9 percent solids with equivalent weight of 606.3 grams/equivalent.

Example 19. [3-[4-[4,6-bis(4-phenylphenyl)-1,3,5-triazin-2-yl]-3-hydroxy-phenoxy]-2-[6-[[1-ethylhexoxycarbonyl(6-isocyanatohexyl)carbamoyl]amino]hexylcarbamoyloxy]propyl] neodecanoate (e.g. an isocyanate-functional covalently-bound triazine UV absorber (bound through the phenolic hydroxyl) oligomer).

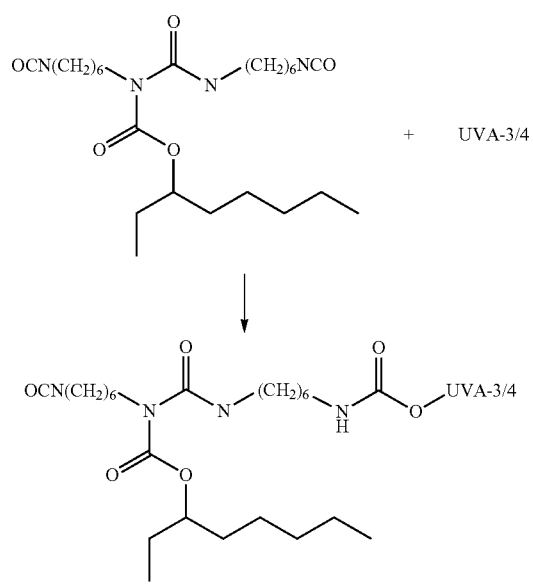

To a room temperature (20° C.) solution of 50 parts urethane grade methyl n-amyl ketone, 16.7 grams of 1-ethylhexyl N-(6-isocyanatohexyl)-N-(6-isocyanatohexylcarbamoyl)carbamate (molecular weight=466.6 g/mole, 0.036 mole, Basonat HA 1000, available from BASF) and 0.05 grams of dibutyl tin dilaurate kept under an inert nitrogen atmosphere was added over two hours a solution of 50 grams of urethane grade methyl n-amyl ketone and 13.44 grams of the triazine UV absorber mixture of Instant Example 2 (0.018 mole). During the addition of the triazine UV absorber solution, the temperature of the reaction batch was not allowed to go above 36° C. After the addition of triazine UV absorber solution was complete, the reaction temperature was kept below 40° C. for seven hours and was followed by NCO titration. The title triazine UV absorber was obtained as a light yellow solution and was covalently attached to the isocyanate molecule. The final product assay was 22.9 percent solids with equivalent weight of 1174 grams/equivalent.

Example 20. [3-[4-[4,6-bis(4-phenylphenyl)-1,3,5-triazin-2-yl]-3-hydroxy-phenoxy]-2-[8-[4-hexyl-2-(8-isocyanatooctyl)-5-octyl-cyclohexyl]octylcarbamoyloxy]propyl] neodecanoate (e.g. isocyanate-functional covalently-bound triazine UV absorber (bound through the phenolic hydroxyl) oligomer).

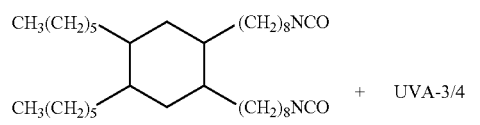

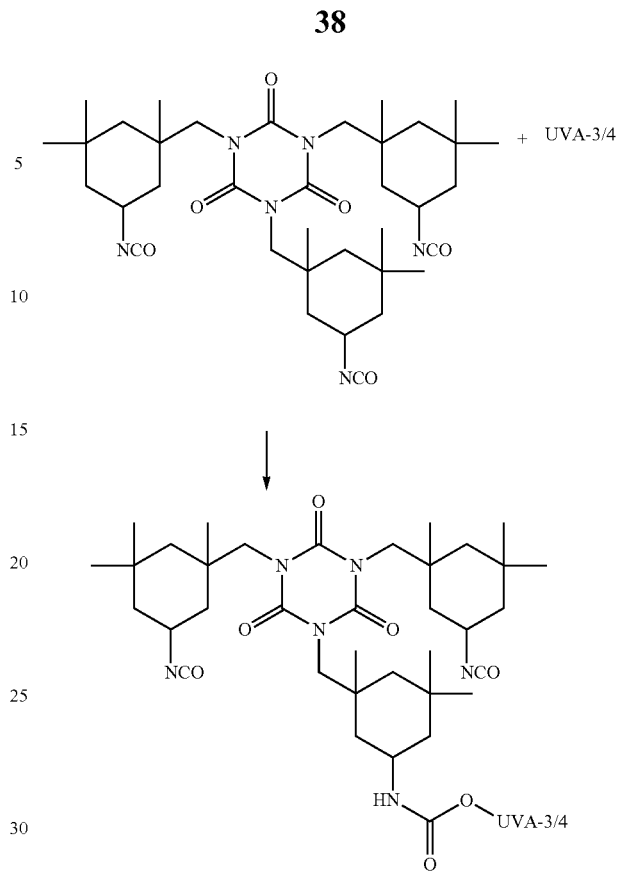

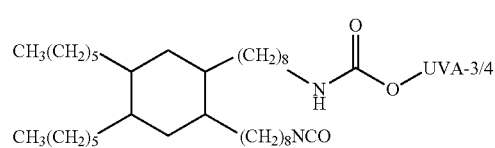

To a room temperature (20° C.) solution of 50 parts urethane grade methyl n-amyl ketone, 25 grams of 1-hexyl-4,5-bis(8-isocyanatooctyl)-2-octyl-cyclohexane (molecular weight=587 g/mole, 0.043 mole, DDI 1410, available from BASF) and 0.05 grams of dibutyl tin dilaurate kept under an inert nitrogen atmosphere was added over two hours a solution of 50 grams of urethane grade methyl n-amyl ketone and 16.44 grams of the triazine UV absorber mixture of Instant Example 2 (0.022 mole). During the addition of the triazine UV absorber solution, the temperature of the reaction batch was not allowed to go above 36° C. After the addition of triazine UV absorber solution was complete, the reaction temperature was kept below 40° C. for seven hours and the reaction completion was followed by NCO titration. The title triazine UV absorber was obtained as a light yellow solution and is covalently attached to the isocyanate molecule. The final product assay was 29.3 percent solids with equivalent weight of 1295 grams/equivalent.

Example 21. [2-[[3-[[3,5-bis[(5-isocyanato-1,3,3-trimethyl-cyclohexyl)methyl]-2,4,6-trioxo-1,3,5-triazinan-1-yl]methyl]-3,5,5-trimethyl-cyclohexyl]carbamoyloxy]-3-[4-[4,6-bis(4-phenylphenyl)-1,3,5-triazin-2-yl]-3-hydroxy-phenoxy]propyl] neodecanoate (e.g. isocyanate-functional covalently-bound triazine UV absorber (bound through the phenolic hydroxyl) oligomer).

To a room temperature (20° C.) solution of 50 parts urethane grade methyl n-amyl ketone, 35.7 grams of 1,3,5-tris[(5-isocyanato-1,3,3-trimethyl-cyclohexyl)methyl]-1,3,5-triazinane-2,4,6-trione (molecular weight=666.9 g/mole, 0.037 mole, Vestanat T 1890 L which is 70% solids, available from Evonik) and 0.05 grams of dibutyl tin dilaurate kept under an inert nitrogen atmosphere was added over two hours a solution of 50 grams of urethane grade methyl n-amyl ketone and 9.33 grams of the triazine UV absorber mixture of Instant Example 2 (0.013 mole). During the addition of the triazine UV absorber solution, the temperature of the reaction batch was not allowed to go above 36° C. After the addition of triazine UV absorber solution was complete, the reaction temperature was kept below 40° C. for seven hours and was followed by NCO titration. The title triazine UV absorber was obtained as a light yellow solution and was covalently attached to the isocyanate molecule. The final product assay was 23.5 percent solids with equivalent weight of 687 grams/equivalent.

Example 22. Preparation of Base Coats—The following basecoats were prepared: Basecoat 22A—A solvent based white basecoat was obtained from Auto Body Supply (Diamont BC 105) and was reduced with UR Reducer (Auto Body Supply) solvent at a ratio of 100 parts Diamont BC 105 to 50 parts UR reducer solvent. The paint mixture was mixed on a paint shaker for 30 minutes. The basecoat was spray applied to an aluminum panel (ACT, aluminum with gray coil coat, item number 16286) and the solvent was allowed to flash off for 15 minutes. The panels were put into an oven at 60 C and cured for 60 minutes. The resulting white base coat had an average dry film thickness of 2.6 mil.

Basecoat 22B—A solvent based black basecoat was obtained from Auto Body Supply (Glasurit 55-1250) and was reduced with Mix Solvent 352-50 (Auto Body Supply)

at a ratio of 100 parts Glasurit 55-1250 to 50 parts Mix Solvent 353-50. The paint mixture was mixed on a paint shaker for 30 minutes. The basecoat was spray applied to an aluminum panel (ACT, aluminum with gray coil coat, item number 16286) and the solvent was allowed to flash off for 15 minutes. The panels were put into an oven at 60 C and cured for 60 minutes. The resulting black base coat had an average dry film thickness of 0.5 mil.

Basecoat 22C—A solvent based silver basecoat was obtained from Auto Body Supply (Diamont BC 170) and was reduced with UR Reducer solvent (Auto Body Supply) at a ratio of 100 parts Diamont BC 170 to 50 parts UR reducer solvent. The paint mixture was mixed on a paint shaker for 30 minutes. The basecoat was spray applied to an aluminum panel (ACT, aluminum with gray coil coat, item number 16286) and the solvent was allowed to flash off for 15 minutes. The panels were put into an oven at 60 C and cured for 60 minutes. The resulting silver base coat had an average dry film thickness of 0.8 mil.

Basecoat 22D—A solvent based maroon basecoat was obtained from Auto Body Supply (Diamont BC 820) and was reduced with UR Reducer solvent (Auto Body Supply) at a ratio of 100 parts Diamont BC 820 to 50 parts UR reducer solvent. The paint mixture was mixed on a paint shaker for 30 minutes. The basecoat was spray applied to an aluminum panel (ACT, aluminum with gray coil coat, item number 16286) and the solvent was allowed to flash off for 15 minutes. The panels were put into an oven at 60 C and cured for 60 minutes. The resulting maroon base coat had an average dry film thickness of 0.5 mil.

Basecoat 22E—A solvent based teal basecoat was obtained from Auto Body Supply (Deltron DBU 4347 SC) and was reduced with Mix Solvent DRR 1170 (Auto Body Supply) at a ratio of 100 parts Deltron DBU 4347 SC to 150 parts Mix Solvent DRR 1170. The paint mixture was mixed on a paint shaker for 30 minutes. The basecoat was spray applied to an aluminum panel (ACT, aluminum with gray coil coat, item number 16286) and the solvent was allowed to flash off for 15 minutes. The panels were put into an oven at 60 C and cured for 60 minutes. The resulting teal base coat had an average dry film thickness of 0.5 mil.

Example 23. Preparation of Clear Coats—The following clear coats were prepared: Stabilized 2-Part Solvent-borne Polyurethane Glossy Clear Top Coat. A glossy stabilized clear top coat was prepared of the formulations below. The UV absorber was added at 2.5 wt % relative to total resin solids, and the hindered amine light stabilizer (HALS) was added at 1.25 wt % relative to total resin solids. The HALS was a mixture of bis (1,2,2,6,6-pentamethyl-4-piperidyl) sebacate and methyl-1,2,2,6,6-pentamethyl-4-piperidyl sebacate ("HALS 1"); or bis(1-octyloxy-2,2,6,6-tetramethylpiperidin-4-yl) sebacate ("HALS 2").

Clear Coat 23A (Comparative)—To a paint can was added Joncryl 500 (56.75 g, 80 percent solids), methylamylketone (20.26 g), BYK® 361N (0.46 g, BYK Additives), di-n-butyltin dilaurate (Aldrich Chemical, 0.7 g of a 1 weight percent solution in methylamylketone), UV absorber (1.75 g based on 100 active solids of either the mixture of β-[3-(2-H-benzotriazole-2-yl)-4-hydroxy-5-tert.butylphenyl]-propionic acid-poly(ethylene glycol) 300-ester, and bis{β-[3-(2-H-benzotriazole-2-yl)-4-hydroxy-5tert.butylphenyl]-propionic acid}-poly(ethylene glycol) 300-ester or 2-(2H-Benzotriazol-2-yl)-6-(1-methyl-1-phenylethyl)-4-(1, 1, 3, 3-tetramethylbutyl) phenol or 2-[4-[(2-Hydroxy-3-dodecyloxypropyl)oxy]-2-hydroxyphenyl]-4,6-bis(2,4-dimethylphenyl)-1,3,5 triazine & 2-[4-[(2-Hydroxy-3-tridecyloxypropyl)oxy]-2-hydroxyphenyl]-4,6-bis(2,4-dimethylphenyl)-1,3,5 triazine, and either HALS 1 or HALS 2 (0.88 g). This mixture was shaken on a paint shaker for 30 minutes. After shaking, Basonat HI 100 (22.76 g, 100% solids) was added to the solution and stirred with a paint stick for 2 minutes. Within one hour, the clear coat or top coat was applied to the appropriate basecoat using draw down bars to obtain a clear coat thickness averaging 2 mil dry film thickness wherein 1 mil is equal to 0.0254 mm or 25.4 microns. The panels were allowed to air dry for 2 days followed by oven curing at 60° C. for 60 minutes. CIE Lab color values were measured.

Clear Coat 23B—To a paint can was added Joncryl 500 (56.75 g, 80 percent solids), methylamylketone (20.26 g), BYK®361N (0.46 g, BYK Additives), di-n-butyltin dilaurate (Aldrich Chemical, 0.7 g of a 1 weight percent solution in methylamylketone), and either HALS 1 or HALS 2 (0.88 g). This mixture was shaken on a paint shaker for 30 minutes. After shaking, Basonat HI 100 (21.39 g, 100% solids) and Instant Example 16 (10.64 g, 27.1% solids with an equivalent weight of 593 grams/equivalent) were added to the solution and stirred with a paint stick for 2 minutes. Within one hour, the clear coat or top coat was applied to the appropriate basecoat using draw down bars to obtain a clear coat thickness averaging 2 mil dry film thickness. The panels were allowed to air dry for 2 days followed by oven curing at 60° C. for 60 minutes. CIE Lab color values were measured. The instant UV absorber was covalently attached to the coating resin.

Clear Coat 23C—To a paint can was added Joncryl 500 (56.75 g, 80 percent solids), methylamylketone (20.26 g), BYK® 361N (0.46 g, BYK Additives), di-n-butyltin dilaurate (Aldrich Chemical, 0.7 g of a 1 weight percent solution in methylamylketone), and either HALS 1 or HALS 2 (0.88 g). This mixture was shaken on a paint shaker for 30 minutes. After shaking, Basonat HI 100 (22.35 g, 100% solids) and Instant Example 17 (11.66 g, 20.1 percent solids with equivalent weight of 1894 grams/equivalent) were added to the solution and stirred with a paint stick for 2 minutes. Within one hour, the clear coat or top coat was applied to the appropriate basecoat using draw down bars to obtain a clear coat thickness averaging 2 mil dry film thickness. The panels were allowed to air dry for 2 days followed by oven curing at 60° C. for 60 minutes. CIE Lab color values were measured. The instant UV absorber was covalently attached to the coating resin.

Clear Coat 23D—To a paint can was added Joncryl 500 (56.75 g, 80 percent solids), methylamylketone (20.26 g), BYK® 361N (0.46 g, BYK Additives), di-n-butyltin dilaurate (Aldrich Chemical, 0.7 g of a 1 weight percent solution in methylamylketone), and either HALS 1 or HALS 2 (0.88 g). This mixture was shaken on a paint shaker for 30 minutes. After shaking, Basonat HI 100 (21.39 g, 100% solids) and Instant Example 18 (11.20 g, 26.9 percent solids with equivalent weight of 606.3 grams/equivalent) were added to the solution and stirred with a paint stick for 2 minutes. Within one hour, the clear coat or top coat was applied to the appropriate basecoat using draw down bars to obtain a clear coat thickness averaging 2 mil dry film thickness. The panels were allowed to air dry for 2 days followed by oven curing at 60° C. for 60 minutes. CIE Lab color values were measured. The instant UV absorber was covalently attached to the coating resin.

Clear Coat 23E—To a paint can was added Joncryl 500 (56.75 g, 80 percent solids), methylamylketone (20.26 g), BYK® 361N (0.46 g, BYK Additives), di-n-butyltin dilaurate (Aldrich Chemical, 0.7 g of a 1 weight percent solution in methylamylketone), and either HALS 1 or HALS 2 (0.88 g). This mixture was shaken on a paint shaker for 30 minutes. After shaking, Basonat HI 100 (21.90 g, 100% solids) and Instant Example 20 (10.92 g, 29.3 percent solids with equivalent weight of 1295 grams/equivalent) were added to the solution and stirred with a paint stick for 2 minutes. Within one hour, the clear coat or top coat was applied to the appropriate basecoat using draw down bars to obtain a clear coat thickness averaging 2 mil dry film thickness. The panels were allowed to air dry for 2 days followed by oven curing at 60° C. for 60 minutes. CIE Lab color values were measured. The instant UV absorber was covalently attached to the coating resin.

Clear Coat 23F—To a paint can was added Joncryl 500 (56.75 g, 80 percent solids), methylamylketone (20.26 g), BYK® 361N (0.46 g, BYK Additives), di-n-butyltin dilaurate (Aldrich Chemical, 0.7 g of a 1 weight percent solution in methylamylketone), and either HALS 1 or HALS 2 (0.88 g). This mixture was shaken on a paint shaker for 30 minutes. After shaking, Basonat HI 100 (21.39 g, 100% solids) and Instant Example 21 (10.92 g, 23.5 percent solids with equivalent weight of 687 grams/equivalent) were added to the solution and stirred with a paint stick for 2 minutes. Within one hour, the clear coat or top coat was applied to the appropriate basecoat using draw down bars to obtain a clear coat thickness averaging 2 mil dry film thickness. The panels were allowed to air dry for 2 days followed by oven curing at 60° C. for 60 minutes. CIE Lab color values were measured. The instant UV absorber was covalently attached to the coating resin.

Clear Coat 23G—To a paint can was added Joncryl 500 (56.75 g, 80 percent solids), methylamylketone (20.26 g), BYK® 361N (0.46 g, BYK Additives), di-n-butyltin dilaurate (Aldrich Chemical, 0.7 g of a 1 weight percent solution in methylamylketone), UV absorber (1.75 g based on 100 active solids of either the mixture of β-[3-(2-H-benzotriazole-2-yl)-4-hydroxy-5-tert.butylphenyl]-propionic acid-poly(ethylene glycol) 300-ester, and bis{β-[3-(2-H-benzotriazole-2-yl)-4-hydroxy-5tert.butylphenyl]-propionic acid}-poly(ethylene glycol) 300-ester or 2-[4-[(2-Hydroxy-3-dodecyloxypropyl)oxy]-2-hydroxyphenyl]-4,6-bis(2,4-dimethylphenyl)-1,3,5 triazine & 2-[4-[(2-Hydroxy-3-tridecyloxypropyl)oxy]-2-hydroxyphenyl]-4,6-bis(2,4-dimethylphenyl)-1,3,5 triazine, and either HALS 1 or HALS 2 (0.88 g). This mixture was shaken on a paint shaker for 30 minutes. After shaking, Basonat HI 100 (21.39 g, 100% solids) and Instant Example 1 (10.64 g, 27.1% solids with an equivalent weight of 593 grams/equivalent) were added to the solution and stirred with a paint stick for 2 minutes. Within one hour, the clear coat or top coat was applied to the appropriate basecoat using draw down bars to obtain a clear coat thickness averaging 2 mil dry film thickness wherein 1 mil is equal to 0.0254 mm or 25.4 microns. The panels were allowed to air dry for 2 days followed by oven curing at 60° C. for 60 minutes. CIE Lab color values were measured. The instant UV absorber was covalently attached to the coating resin.

Example 24. Base Coat/Clear Coat Data for the Associated Paint Systems—The CIE Lab color data for the inventive white paint formulation is given below:

| Formulation Number | Base Coat | Clear Coat | L value | a Value | b Value |
|---|---|---|---|---|---|
| 24A | 22A | 23B | 88.52 | −1.75 | −1.11 |
| 24B | 22A | 23C | 86.51 | −1.94 | −1.44 |
| 24C | 22A | 23D | 86.57 | −1.82 | −1.64 |
| 24D | 22A | 23E | 85.91 | −1.97 | −1.52 |
| 24E | 22A | 23F | 84.41 | −1.98 | −2.12 |
| 24F | 22A | 23G | 85.08 | −2.08 | −1.72 |

HALS 1 was used in all of these formulations. The UV absorber in 23G was of β-[3-(2-H-benzotriazole-2-yl)-4-hydroxy-5-tert.butylphenyl]-propionic acid-poly(ethylene glycol) 300-ester, and bis{β-[3-(2-H-benzotriazole-2-yl)-4-hydroxy-5tert.butylphenyl]-propionic acid}-poly(ethylene glycol) 300-ester and the inventive UV absorber.

Example 25. Base Coat/Clear Coat Data for the Associated Paint Systems—The CIE Lab color data for the inventive black paint formulation is given below:

| Formulation Number | Base Coat | Clear Coat | L value | a Value | b Value |
|---|---|---|---|---|---|
| 25A | 22B | 23B | 24.51 | −0.12 | −0.51 |
| 25B | 22B | 23C | 24.31 | −0.02 | −0.63 |
| 25C | 22B | 23D | 24.24 | 0.01 | −0.62 |
| 25D | 22B | 23E | 24.3 | 0 | −0.7 |
| 25E | 22B | 23F | 24.43 | 0 | −0.55 |
| 25F | 22B | 23G | 24.32 | 0.03 | −0.68 |

HALS 1 was used in all of these formulations. The UV absorber in 23G was of β-[3-(2-H-benzotriazole-2-yl)-4-hydroxy-5-tert.butylphenyl]-propionic acid-poly(ethylene glycol) 300-ester, and bis{f-[3-(2-H-benzotriazole-2-yl)-4-hydroxy-5tert.butylphenyl]-propionic acid}-poly(ethylene glycol) 300-ester and the inventive UV absorber.

Example 26. Base Coat/Clear Coat Data for the Associated Paint Systems—The CIE Lab color data for the inventive silver paint formulation is given below:

| Formulation Number | Base Coat | Clear Coat | L value | a Value | b Value |
|---|---|---|---|---|---|
| 26A | 22C | 23B | 77.43 | −0.69 | −0.17 |
| 26B | 22C | 23C | 77.04 | −0.74 | −0.12 |
| 26C | 22C | 23D | 72.65 | −0.69 | −0.4 |
| 26D | 22C | 23E | 74.24 | −0.75 | −0.19 |
| 26E | 22C | 23F | 71.31 | −0.68 | −0.47 |
| 26F | 22C | 23G | 74.58 | −0.81 | −0.16 |

HALS 1 was used in all of these formulations. The UV absorber in 23G was of β-[3-(2-H-benzotriazole-2-yl)-4-hydroxy-5-tert.butylphenyl]-propionic acid-poly(ethylene glycol) 300-ester, and bis{f-[3-(2-H-benzotriazole-2-yl)-4-hydroxy-5tert.butylphenyl]-propionic acid}-poly(ethylene glycol) 300-ester and the inventive UV absorber.

Example 27. Base Coat/Clear Coat Data for the Associated Paint Systems—The CIE Lab color data for the inventive maroon paint formulation is given below:

| Formulation Number | Base Coat | Clear Coat | L value | a Value | b Value |
|---|---|---|---|---|---|
| 27A | 22D | 23B | 26.55 | 7.62 | 2.11 |
| 27B | 22D | 23C | 26.67 | 8.06 | 2.28 |
| 27C | 22D | 23D | 26.64 | 7.9 | 2.17 |
| 27D | 22D | 23E | 26.5 | 7.72 | 2.09 |
| 27E | 22D | 23G | 26.68 | 8.17 | 2.27 |

HALS 2 was used in all of these formulations. The UV absorber in 23G was 2-[4-[(2-Hydroxy-3-dodecyloxypropyl)oxy]-2-hydroxyphenyl]-4,6-bis(2,4-dimethylphenyl)-1,3,5 triazine & 2-[4-[(2-Hydroxy-3-tridecyloxypropyl)oxy]-2-hydroxyphenyl]-4,6-bis(2,4-dimethylphenyl)-1,3,5 triazine and the inventive UV absorber.

Example 28. Base Coat/Clear Coat Data for the Associated Paint Systems—The CIE Lab color data for the inventive teal paint formulation is given below:

| Formulation Number | Base Coat | Clear Coat | L value | a Value | b Value |
|---|---|---|---|---|---|
| 28A | 22E | 23B | 36.74 | −9.77 | −7.53 |
| 28B | 22E | 23C | 36.88 | −9.79 | −7.49 |
| 28C | 22E | 23D | 36.82 | −9.8 | −7.53 |
| 28D | 22E | 23E | 34.58 | −11.14 | −6.52 |
| 28E | 22E | 23G | 34.81 | −11.27 | −6.67 |

HALS 2 was used in all of these formulations. The UV absorber in 23G was 2-[4-[(2-Hydroxy-3-dodecyloxypropyl)oxy]-2-hydroxyphenyl]-4,6-bis(2,4-dimethylphenyl)-1,3,5 triazine & 2-[4-[(2-Hydroxy-3-tridecyloxypropyl)oxy]-2-hydroxyphenyl]-4,6-bis(2,4-dimethylphenyl)-1,3,5 triazine and the inventive UV absorber.

Example 29. Percent Transmission Data of the Inventive Clear Coats—Clear coats were prepared of Instant Example 23 and were applied to fused quartz plates at a dry film thickness of 2.0 mils. The absorbance at various wavelengths was measured using a UV-vis spectrophotometer and the absorbance readings were converted to percent transmission (% T) at various wavelengths. In formulations where the UV absorber (UVA) was present, the concentration was 2.5 weight percent UVA actives relative to total resin solids

| Clear Coat | UVA | HALS | % T at 325 nm | % T at 350 nm | % T at 375 m |
|---|---|---|---|---|---|
| 23A | None | None | 85.59 | 91.28 | 92.09 |
| 23A | None | HALS 2 | 84.39 | 92.31 | 93.38 |
| 23A | Example 3 (Comp) | HALS 2 | 0.04 | 0.10 | 36.79 |
| 23B | Example 16 | HALS 2 | 0.03 | 0.11 | 33.86 |
| 23C | Example 17 | HALS 2 | 0.02 | 0.09 | 25.29 |
| 23D | Example 18 | HALS 2 | 0.02 | 0.13 | 31.98 |
| 23E | Example 19 | HALS 2 | 0.02 | 0.10 | 27.18 |
| 23F | Example 21 | HALS 2 | 0.02 | 0.14 | 35.67 |

HALS 2 was bis(1-octyloxy-2,2,6,6-tetramethylpiperidin-4-yl) sebacate. Comparative Example 3 was 2-[4-[(2-Hydroxy-3-dodecyloxypropyl)oxy]-2-hydroxyphenyl]-4,6-bis(2,4-dimethylphenyl)-1,3,5 triazine & 2-[4-[(2-Hydroxy-3-tridecyloxypropyl)oxy]-2-hydroxyphenyl]-4,6-bis(2,4-dimethylphenyl)-1,3,5 triazine and the inventive UV absorber.

The instant UV absorbers have a greater efficacy for absorbing UV light and reduce the UV light penetration in the exterior film layer relative to UV absorbers described in the prior art. This is especially true for the 250 nm to the 375 nm region.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A coating composition comprising:
a coating resin;
a triazine ultraviolet light absorber of Formula (I); and
a hindered amine light stabilizer;

wherein:
Formula (I) has the structure:

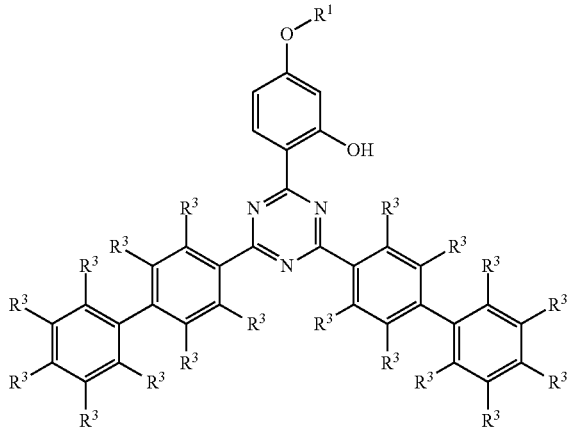

R$^1$ is C$_1$-C$_{18}$ straight chain alkyl, C$_3$-C$_{18}$ branched chain alkyl, or a 5-12 membered cycloalkyl, wherein each of the C$_1$-C$_{18}$ straight chain alkyl, C$_3$-C$_{18}$ branched chain alkyl and the 5-12 membered cycloalkyl is substituted with one or more of —OR$^5$, —NR$^5$R$^5$, —C(O)N(R$^5$)$_2$, —C(O)R$^5$, —C(O)OR$^5$, —NCO—, or —OC(O)R$^5$; or said alkyl or said cycloalkyl is interrupted by one to four epoxy, —O—, —NR$^5$—, —CONR$^5$—, —COO—, —OCO—, —CO—, —C(R$^5$)=C(R$^5$)COO—, —OCOC(R$^5$)=C(R$^5$)—, —C(R$^5$)=C(R$^5$)—, phenylene or phenylene-G-phenylene in which G is —O—, —S—, —SO$_2$—, —CH$_2$— or —C(CH$_3$)$_2$— or combinations thereof, or said C$_1$-C$_{18}$ straight chain alkyl, C$_3$-C$_{18}$ branched chain alkyl, or a 5-12 membered cycloalkyl both substituted and interrupted by combinations of the groups mentioned above;

each R$^5$ is independently H, C$_1$-C$_{24}$ straight or branched chain alkyl, C$_2$-C$_{24}$ alkenyl, C$_6$-C$_{10}$ aryl, or a 5-12 membered cycloalkyl;

each R$^3$ is independently H, cyano, halo, a C$_1$-C$_{10}$ alkyl, a C$_1$-C$_{10}$ alkoxy, a 5-12 membered cycloalkyl, —C(O)R$^{15}$, —C(O)(O)R$^{15}$, or —C(O)NR$^{15}$R$^{15}$;

each R$^{15}$ is independently H or C$_1$-C$_8$ alkyl; and the triazine ultraviolet light absorber is covalently linked to the coating resin through R$^1$, wherein the covalent link is between the coating resin and the one or more —OR$^5$, —NR$^5$R$^5$, —C(O)N(R$^5$)$_2$, —C(O)R$^5$, —C(O)OR$^5$, or —OC(O)R$^5$ of R$^1$.

2. The coating composition of claim 1, wherein R$^1$ is a substituted C$_1$-C$_{18}$ alkyl or C$_3$-C$_{18}$ branched chain alkyl.

3. The coating composition of claim 2, wherein R$^1$ is substituted with one or more of —OH, —NR$^5$R$^5$, or —OC(O)R$^5$.

4. The coating composition of claim 1, wherein R$^5$ is a C$_9$ branched chain alkyl.

5. The coating composition of claim 1, wherein each R$^3$ is H.

6. The coating composition of claim 1, wherein the coating resin is covalently linked to the R$^1$ group of Formula (I) wherein the covalent linkage is selected from the group consisting of —OC(O)NH, —NHC(O)NH—, —NHC(O)—, —OC(O)NR$^5$—, —NR$^5$C(O)NH—, —NR$^5$C(O)—, and —NR$^5$CONR$^5$—.

7. The coating composition of claim 1, wherein the coating resin is selected from the group consisting of a thermoset acrylic melamine resin, an acrylic urethane resin, an epoxy carboxy resin, a silane modified acrylic melamine, an acrylic resin with carbamate pendant groups crosslinked with melamine, and an acrylic polyol resin crosslinked with melamine containing carbamate groups.

8. The coating composition of claim 1, wherein the triazine ultraviolet light absorber is selected from the group consisting of:

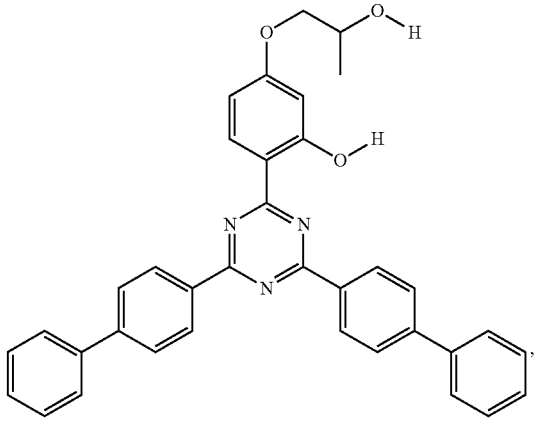

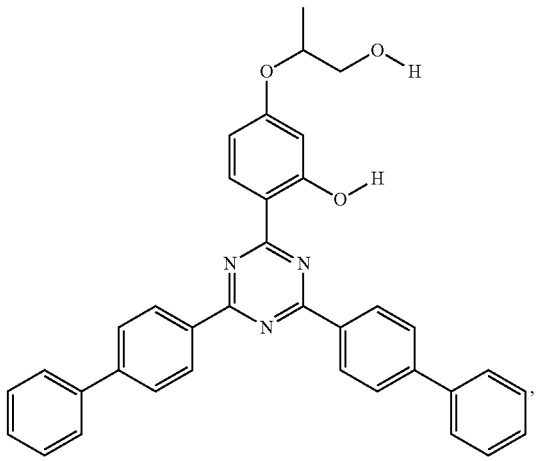

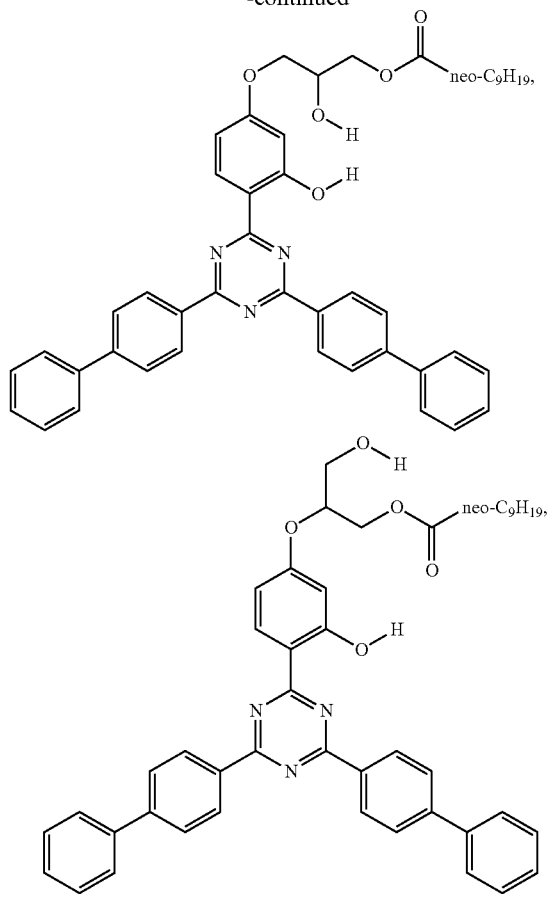

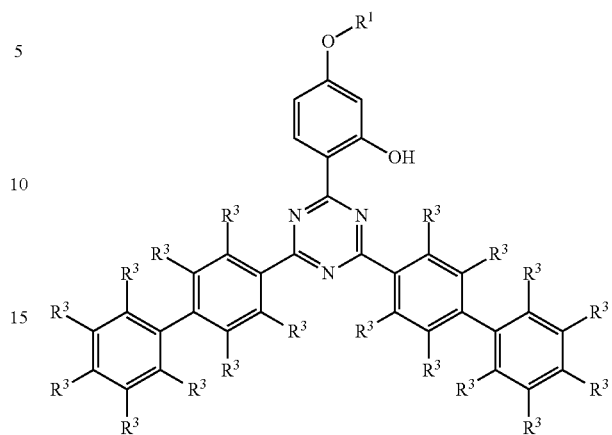

wherein neoC$_9$H$_{19}$ is C$_9$ branched chain alkyl.

9. The coating composition of claim 1 further comprising another ultraviolet light absorber selected from the group consisting of a hydroxyphenylbenzotriazole, a hydroxyphenyl-s-triazine, a benzophenone, an ester of a benzoic acid, an acrylate, a malonate, an oxamide, and a mixture of any two or more thereof.

10. The coating composition of claim 1, wherein the triazine ultraviolet light absorber of Formula (I) is present from about 0.1 wt % to about 25 wt % on a total solids basis.

11. A method of stabilizing a coating composition on a substrate toward ultraviolet radiation, the method comprising applying the coating composition of claim 1 to the substrate.

12. A durability enhancing agent comprising:
the reaction product of a) ultraviolet light absorbers (UVA) and mixtures thereof having a reactive functionality thereon; and b) a non-acrylic monomeric, oligomeric or polymeric component, having a reactive functionality thereon to react with the reactive functionality of a);
wherein:
either a) or b) includes at least one carbamate functional group, a group convertible to a carbamate group, or a group that crosslinks with a carbamate functional group, and the final product is a polymer-covalently bound UVA that includes more than one carbamate functional group, group convertible to a carbamate group, or a group that crosslinks with a carbamate functional group;

the UVA is a triazine UV absorber of Formula (I)

R$^1$ is C$_1$-C$_{18}$ straight chain alkyl, C$_3$-C$_{18}$ branched chain alkyl, or a 5-12 membered cycloalkyl, wherein each of the C$_1$-C$_{18}$ straight chain alkyl, C$_3$-C$_{18}$ branched chain alkyl and the 5-12 membered cycloalkyl is substituted with one or more of —OR$^5$, —NR$^5$R$^5$, —C(O)N(R$^5$)2, —C(O)R$^5$, —OC(O), —NCO—, or —OC(O)R$^5$; or said alkyl or said cycloalkyl is interrupted by one to four epoxy, —O—, —NR$^5$—, —CONR$^5$—, —COO—, —OCO—, —CO—, —C(R$^5$)=C(R$^5$)COO—, —OCOC(R$^5$)=C(R$^5$)—, —C(R$^5$)=C(R$^5$)—, phenylene or phenylene-G-phenylene in which G is —O—, —S—, —SO$_2$—, —CH$_2$— or —C(CH$_3$)$_2$— or combinations thereof, or said alkyl or said cycloalkyl both substituted and interrupted by combinations of the groups mentioned above;

each R$^5$ is independently H, C$_1$-C$_{24}$ straight or branched chain alkyl, C$_2$-C$_{24}$ alkenyl, C$_6$-C$_{10}$ aryl, or a 5-12 membered cycloalkyl;

each R$^3$ is independently H, cyano, halo, a C$_1$-C$_{10}$ alkyl, a C$_1$-C$_{10}$ alkoxy, a 5-12 membered cycloalkyl, —C(O)R$^{15}$, —C(O)(O)R$^{15}$, or —C(O)NR$^{15}$R$^{15}$;

each R$^{15}$ is independently H or C$_1$-C$_8$ alkyl; and the triazine ultraviolet light absorber of Formula (I) is covalently linked to the coating resin through R$^1$, wherein the covalent link is between the coating resin and the one or more —OR$^5$, —NR$^5$R$^5$, —C(O)N(R$^5$)$_2$, —C(O)R$^5$, —OC(O), or —OC(O)R$^5$ of R$^1$.

13. The durability enhancing agent of claim 12 further comprising a hindered amine light stabilizer.

14. A curable coating composition comprising:
the durability enhancing agent of claim 12;
a second oligomeric or polymeric resin comprising crosslinkable functional groups and selected from the group consisting of tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, lysine diisocyanate, tetramethylxylylene diisocyanate, trimethylhexane diisocyanate, tetramethylhexane diisocyanate, 1,4-, 1,3- or 1,2-diisocyanatocyclohexane, 4,4'- or 2,4'-di(isocyanatocyclohexyl) methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4- or 2,6-diisocyanato-1-methylcyclohexane, tolylene 2,4- or 2,6-diisocyanate, m- or p-xylylene diisocyanate, 2,4'- or 4,4'-diisocyanato-diphenylmethane, phenylene 1,3- or 1,4-diisocyanate, 1-chlorophenylene 2,4-diisocyanate, naphthylene 1,5-diisocyanate, diphenylene 4,4'-diisocyanate, 4,4'-diisocyanato-3,3'-dimethylbiphenyl, 3-methyldiphenyl-methane 4,4'-diisocyanate, tetramethylxylylene diisocyanate, 1,4-diisocyanatobenzene or diphenyl ether 4,4'-diisocyanate, 1,4-diisocyanatobutane, 1,5-diisocyanatopentane, hexamethylene diisocyanate (HDI), 1,11-diisocyanatoundecane, 1,12-diisocyanatododecane, 2,2,4- and 2,4,4-trimethyl-1,6-diisocyanatohexane, 1-isocyanato-3,3,5-trimethyl-5-isocyanatomethyl cyclohexane (IPDI, isophorone diisocyanate), 1,3-diisocyanatocyclobutane, 1,3- and 1,4-diisocyanatocyclohexane, 4,4'-bis-(isocyanatocyclohexyl)-methane (HMDI), 1,2-bis-(isocyanatomethyl)-cyclobutane, 1,3- and 1,4-bis-(isocyanatomethyl)-cyclohexane, hexahydro-2,4- and/or -2,6-diisocyanatotoluene, bis-isocyanatomethyl norbornane (isomer mixture), 2,5- and 2,6-bis-(isocyanatomethyl)-bicyclo[2.2.1]heptane, 1-isocyanato-4(3)-isocyanatomethyl-1-methyl cyclohexane, p-xylylene diisocyanate, 2,3-bis-(8-isocyanatooctyl)-4-octyl-5-hexyl cyclohexane and mixtures thereof; and (a) a crosslinking agent having reactive functionality that is reactive with said crosslinkable functional groups on the durability enhancing agent and on the additional oligomer or polymer.

15. The curable coating composition of claim 14, the composition comprising:
a) the non-acrylic monomers, oligomers and polymers having thereon, a reactive functionally capable of undergoing a crosslinking reaction, wherein the reactive functionality comprises at least one functional group selected from the group consisting of primary carbamate groups, and functional groups convertible to primary carbamate groups, said oligomers having a weight average molecular weight of less than or equal to 2000 and said polymers having a molecular weight of greater than 2000, and mixtures of said polymers and oligomers;
b) a crosslinking agent having more than one functional group reactive with the carbamate functionality on component (a);
wherein component a) further comprises at least one ultraviolet light absorbing compound of Formula (I) onto component (a), wherein a crosslinked film formed from the cured coating composition demonstrates resistance to color change and gloss retention.

16. The curable coating composition of claim 15, wherein composition comprises:
a) a polymer backbone having appended thereto more than one carbamate functional group, said polymer backbone being represented by randomly repeating units according to formula (III):

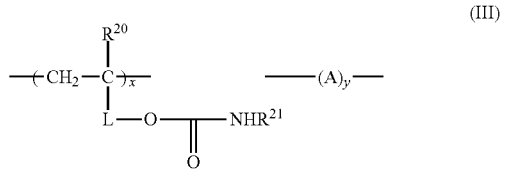

(III)

wherein:
$R^{20}$ represents H, or $CH_3$; $R^{21}$ represents H,
L is a divalent linking group selected from the group consisting of an aliphatic group of 1 to 8 carbon atoms, cycloaliphatic and aromatic linking groups of 6 to 10 carbon atoms, and —NHC(O)O—;
A is a repeat unit derived from one or more ethylenically unsaturated monomers;
X represents 10 to 90 weight percent; and
Y represents 90 to 10 weight percent.

17. A curable coating composition comprising
A) an oligomeric or polymeric resin comprising crosslinkable functional groups wherein said oligomer or polymeric resin is selected from the group consisting of polyesters, polyethers, polyols, epoxies, urethane ureas, acrylics, polyamides, oligomers thereof, polymers thereof, and mixtures of any two or more thereof; and
B) a crosslinking agent comprising the reaction product of a) the durability enhancing agent of claim 12, wherein the durability enhancing agent comprises at least one primary carbamate reactive functionality; and b) a crosslinking compound that is selected from the group consisting of blocked and unblocked polyisocyanates, isocyanurate trimers of the polyisocyanates, urea resins, alkoxy ureas, polyanhydrides, polyepoxies and polysiloxanes.

18. The coating composition of claim 17 wherein the crosslinking compound comprises a polyisocyanate or an isocyanurate trimers thereof, reactive with the polyisocyanate or isocyanurate trimers thereof, selected from the group consisting of amine, primary carbamate and hydroxyl functionality.

19. The curable coating composition of claim 18 comprising:
A) the non-acrylic oligomeric or polymeric resin comprising crosslinkable functional groups wherein said oligomer or polymeric resin is selected from the group consisting of esters, ethers, polyols, epoxy, alkyd, urethane urea, acrylic, and polyamide, oligomers and polymers and mixtures thereof; and
B) a crosslinking agent comprising thereon a durability enhancing agent and functionality reactive with the crosslinkable functional groups of (A), wherein component B) is the reaction product of:
a) compounds selected from triazine ultraviolet light absorbers of formula (I) and mixtures thereof, said compounds having at least one primary carbamate reactive functionality; and
b) is a monomeric, oligomeric or polymeric component selected from the group consisting of aminoplast compounds which are fully or partially alkylated;
wherein the primary carbamate reactive functionality of component a) reacts with component b).

20. The coating composition of claim 1, wherein the hindered amine light stabilizer is selected from the group consisting of:
1-cyclohexyloxy-2,2,6,6-tetramethyl-4-octadecylaminopiperidine;
bis(2,2,6,6-tetramethylpiperidin-4-yl) sebacate;
bis(1-acetoxy-2,2,6,6-tetramethylpiperidin-4-yl) sebacate;
bis(1,2,2,6,6-pentamethyl-4-yl) sebacate;
bis(1-cyclohexyloxy-2,2,6,6-tetramethylpiperidin-4-yl) sebacate;
bis(1-octyloxy-2,2,6,6-tetramethylpiperidin-4-yl) sebacate;

bis(1-acyl-2,2,6,6-tetramethylpiperidin-4-yl) sebacate;
bis(1,2,2,6,6-pentamethyl-4-piperidyl) n-butyl-3,5-di-tert-butyl-4-hydroxybenzylmalonate;
2,4-bis[(1-cyclohexyloxy-2,2,6,6-tetramethylpiperidin-4-yl)butylamino]-6-(2-hydroxyethylamino-s-triazine;
bis(1-cyclohexyloxy-2,2,6,6-tetramethylpiperidin-4-yl) adipate;
2,4-bis[(1-cyclohexyloxy-2,2,6,6-piperidin-4-yl)butylamino]-6-chloro-s-triazine;
1-(2-hydroxy-2-methylpropoxy)-4-hydroxy-2,2,6,6-tetramethylpiperidine;
1-(2-hydroxy-2-methylpropoxy)-4-oxo-2,2,6,6-tetramethylpiperidine;
1-(2-hydroxy-2-methylpropoxy)-4-octadecanoyloxy-2,2,6,6-tetramethyl-piperidine;
bis(1-(2-hydroxy-2-methylpropoxy)-2,2,6,6-tetramethylpiperidin-4-yl) sebacate;
bis(1-(2-hydroxy-2-methylpropoxy)-2,2,6,6-tetramethylpiperidin-4-yl) adipate;
2,4-bis{N-[1-(2-hydroxy-2-methylpropoxy)-2,2,6,6-tetramethylpiperidin-4-yl]-N-butylamino}-6-(2-hydroxyethylamino)-s-triazine;
4-benzoyl-2,2,6,6-tetramethylpiperidine;
di-(1,2,2,6,6-pentamethylpiperidin-4-yl) p-methoxybenzylidenemalonate;
4-stearyloxy-2,2,6,6-tetramethylpiperidine;
bis(1-octyloxy-2,2,6,6-tetramethylpiperidyl) succinate;
1,2,2,6,6-pentamethyl-4-aminopiperidine;
2-undecyl-7,7,9,9-tetramethyl-1-oxa-3,8-diaza-4-oxospiro[4,5]decane;
tris(2,2,6,6-tetramethyl-4-piperidyl) nitrilotriacetate;
tris(2-hydroxy-3-(amino-(2,2,6,6-tetramethylpiperidin-4-yl)propyl) nitrilotriacetate;
tetrakis-(2,2,6,6-tetramethyl-4-piperidyl)-1,2,3,4-butane-tetracarboxylate;
tetrakis-(1,2,2,6,6-pentamethyl-4-piperidyl)-1,2,3,4-butane-tetracarboxylate;
1,1'-(1,2-ethanediyl)-bis-(3,3,5,5-tetramethylpiperazinone);
3-n-octyl-7,7,9,9-tetramethyl-1,3,8-triazaspiro[4.5]decan-2,4-dione;
8-acetyl-3-dodecyl-7,7,9,9-tetramethyl-1,3,8-triazaspiro[4.5]decane-2,4-dione;
3-dodecyl-1-(2,2,6,6-tetramethyl-4-piperidyl)pyrrolidin-2,5-dione;
3-dodecyl-1-(1,2,2,6,6-pentamethyl-4-piperidyl)pyrrolidine-2,5-dione;
N,N'-bis-formyl-N,N'-bis(2,2,6,6-tetramethyl-4-piperidyl)hexamethylenediamine;
the reaction product of 2,4-bis[(1-cyclohexyloxy-2,2,6,6-piperidin-4-yl)-butylamino]-6-chloro-s-triazine with N,N'-bis(3-aminopropyl)ethylenediamine) (CAS number 191680-81-6);
the condensate of 1-(2-hydroxyethyl)-2,2,6,6-tetramethyl-4-hydroxypiperidine and succinic acid (CAS number 65447-77-0);
linear or cyclic condensates of N,N'-bis(2,2,6,6-tetramethyl-4-piperidyl)-hexamethylenediamine and 4-tert-octylamino-2,6-dichloro-1,3,5-triazine (CAS number 71878-19-8 and CAS number 70624-18-9);
linear or cyclic condensates of N,N'-bis(2,2,6,6-tetramethyl-4-piperidyl)-hexamethylenediamine and 4-cyclohexylamino-2,6-dichloro-1,3,5-triazine;
linear or cyclic condensates of N,N'-bis-(2,2,6,6-tetramethyl-4-piperidyl)-hexamethylenediamine and 4-morpholino-2,6-dichloro-1,3,5-triazine (CAS number 82451-48-7);
linear or cyclic condensates of N,N'-bis-(1,2,2,6,6-pentamethyl-4-piperidyl)-hexamethylenediamine and 4-morpholino-2,6-dichloro-1,3,5-triazine (CAS number 193098-40-7);
the condensate of 2-chloro-4,6-bis(4-n-butylamino-2,2,6,6-tetramethylpiperidyl)-1,3,5-triazine and 1,2-bis(3-aminopropylamino)ethane (CAS number 106990-43-6);
the condensate of 2-chloro-4,6-di-(4-n-butylamino-1,2,2,6,6-pentamethylpiperidyl)-1,3,5-triazine and 1,2-bis-(3-aminopropylamino)ethane;
a reaction product of 7,7,9,9-tetramethyl-2-cycloundecyl-1-oxa-3,8-diaza-4-oxospiro[4,5]decane and epichlorohydrin (CAS number 202483-55-4);
poly[methyl,(3-oxy-(2,2,6,6-tetramethylpiperidin-4-yl) propyl)] siloxane (CAS number 164648-93-5);
reaction product of maleic acid anhydride-C18-C22-α-olefin-copolymer with 2,2,6,6-tetramethyl-4-aminopiperidine (CAS number 152261-33-1);
the oligomeric compound which is the condensation product of 4,4'-hexa-methylene-bis(amino-2,2,6,6-tetramethylpiperidine) and 2,4-dichloro-6-[(2,2,6,6-tetramethylpiperidin-4-yl)butylamino]-s-triazine end-capped with 2-chloro-4, 6-bis(dibutylamino)-s-triazine;
the oligomeric compound which is the condensation product of 4,4'-hexa-methylenebis(amino-1,2,2,6,6-pentaamethylpiperidine) and 2,4-dichloro-6-[(1,2,2,6,6-pentaamethylpiperidin-4-yl)butylamino]-s-triazine end-capped with 2-chloro-4,6-bis(dibutylamino)-s-triazine (CAS number 192268-64-7);
the oligomeric compound which is the condensation product of 4,4'-hexa-methylenebis(amino-1-propoxy-2,2,6,6-tetramethylpiperidine) and 2,4-dichloro-6-[(1-propoxy-2,2,6,6-tetramethylpiperidin-4-yl) butylamino]-s-triazine end-capped with 2-chloro-4,6-bis(dibutylamino)-s-triazine;
the oligomeric compound which is the condensation product of 4,4'-hexa-methylenebis(amino-1-acyloxy-2,2,6,6-tetramethylpiperidine) and 2,4-dichloro-6-[(1-acyloxy-2,2,6,6-tetramethylpiperidin-4-yl)butylamino]-s-triazine end-capped with 2-chloro-4, 6-bis(dibutylamino)-s-triazine;
product obtained by reacting a product, obtained by reacting 1,2-bis(3-amino-propylamino)ethane with cyanuric chloride, with (2,2,6,6-tetramethyl-piperidin-4-yl)butylamine (CAS number 136504-96-6);
1,6-hexanediamine,N1,N6-bis(2,2,6,6-tetramethyl-4-piperidinyl)-, polymer with 2,4,6-trichloro-1,3,5-triazine, reaction products with 3-bromo-1-propene, N-butyl-1-butanamine, and N-butyl-2,2,6,6-tetramethyl-4-piperidinamine, oxidized, hydrogenated (CAS number 247243-62-5); and
a mixture of any two or more thereof.

21. The coating composition of claim 1, wherein $R^1$ is $C_1$-$C_{18}$ straight chain alkyl, $C_3$-$C_{18}$ branched chain alkyl, or a 5-12 membered cycloalkyl, wherein each of the $C_1$-$C_{18}$ straight chain alkyl, $C_3$-$C_{18}$ branched chain alkyl and the 5-12 membered cycloalkyl is substituted with one or more of —$OR^5$, —$NR^5R^5$, —$C(O)N(R^5)_2$, —$C(O)R^5$, NCO—, or —$OC(O)R^5$; or said alkyl or said cycloalkyl is interrupted by one to four epoxy, —O—, —$NR^5$—, —$CONR^5$—, —COO—, —OCO—, —CO—, —$C(R^5)=C(R^5)COO$—, —$OCOC(R^5)=C(R^5)$—, —$C(R^5)=C(R^5)$—, phenylene or phenylene-G-phenylene in which G is —O—, —S—, —$SO_2$—, —$CH_2$— or —$C(CH_3)_2$— or combinations thereof, or said $C_1$-$C_{18}$ straight chain alkyl, $C_3$-$C_{18}$ branched chain alkyl, or a 5-12 membered cycloalkyl both substituted and interrupted by combinations of the groups mentioned above;

each $R^5$ is independently H, $C_1$-$C_{24}$ straight or branched chain alkyl, $C_2$-$C_{24}$ alkenyl, $C_6$-$C_{10}$ aryl, or a 5-12 membered cycloalkyl;

each $R^3$ is independently H, cyano, halo, a $C_1$-$C_{10}$ alkyl, a $C_1$-$C_{10}$ alkoxy, a 5-12 membered cycloalkyl, —C(O)$R^{15}$, —C(O)(O)$R^{15}$, or —C(O)NR$^{15}$R$^{15}$;

each $R^{15}$ is independently H or $C_1$-$C_8$ alkyl; and the triazine ultraviolet light absorber is covalently linked to the coating resin through $R^1$, wherein the covalent link is between the coating resin and the one or more —OR$^5$, —NR$^5$R$^5$, —C(O)N(R$^5$)$_2$, —C(O)R$^5$, or —OC(O)R$^5$ of $R^1$.

* * * * *